US008069453B2

(12) United States Patent
Miyazaki

(10) Patent No.: US 8,069,453 B2
(45) Date of Patent: Nov. 29, 2011

(54) TRANSFER MECHANISM AND DEVICE, AND ELECTRONIC DEVICE

(75) Inventor: Akihiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 886 days.

(21) Appl. No.: 12/075,556

(22) Filed: Mar. 12, 2008

(65) Prior Publication Data

US 2008/0229340 A1   Sep. 18, 2008

(30) Foreign Application Priority Data

Mar. 13, 2007   (JP) ................................. 2007-063981

(51) Int. Cl.
*G11B 17/04* (2006.01)
*G11B 17/03* (2006.01)

(52) U.S. Cl. .......................... 720/612; 720/613; 720/713

(58) Field of Classification Search .......... 720/601–608, 720/610, 612–613, 632–635, 640, 645–646, 720/653–655, 661, 667, 689–694, 711–714; 347/262–264

See application file for complete search history.

(56) References Cited

U.S. PATENT DOCUMENTS

| 6,046,975 A * | 4/2000 | Seo ............................... 720/713 |
| 2005/0022214 A1* | 1/2005 | Ho ............................... 720/600 |

FOREIGN PATENT DOCUMENTS

| JP | 09320162 A | * 12/1997 |
| JP | 10302363 A | * 11/1998 |
| JP | 2003-085861 A | 3/2003 |
| JP | 2004-272964 A | 9/2004 |
| JP | 2008-204559 A | 9/2008 |

OTHER PUBLICATIONS

Machine-Assisted Translation of JP 09320162 A.*
Machine-Assisted Translation of JP 10302363 A.*

* cited by examiner

*Primary Examiner* — Nathan Danielsen
(74) *Attorney, Agent, or Firm* — Wolf, Greenfield & Sacks, P.C.

(57) ABSTRACT

A transfer mechanism includes: a tray that includes a placement surface section on which a recording medium is placed, and retention means for keeping hold of the recording medium placed on the placement surface section, and is moved and rotated across an insertion/removal position at which the tray is faced toward the outside of a device body with the placement surface section being substantially horizontal and a recording/reproduction position at which the tray is housed in the device body with the placement surface section being substantially vertical; a clamp member that is supported inside of the device body to allow a main surface section thereof to move and rotate across a substantially-horizontal direction and a substantially-vertical direction, and clamps, with a support mechanism, the recording medium moved and rotated to the recording/reproduction position; and a movement mechanism that moves the tray.

13 Claims, 16 Drawing Sheets

TRANSFER MECHANISM AND DEVICE, AND ELECTRONIC DEVICE

CROSS REFERENCES TO RELATED APPLICATIONS

The present invention contains subject matter related to Japanese Patent Application JP 2007-063981 filed in the Japanese Patent Office on Mar. 13, 2007, the entire contents of which being incorporated herein by reference.

BACKGROUND OF THE INVENTION

1. Field of the Invention

The present invention relates to a transfer mechanism that transfers a transfer body across inside and outside of a device body using a transfer tray and, more specifically, to a transfer mechanism that performs loading/unloading of the transfer body by directing the transfer tray in a first direction, and houses the transfer body inside of the device body by directing the transfer tray in a direction substantially orthogonal to the first direction, a transfer device using such a transfer mechanism, and an electronic device.

2. Description of the Related Art

Optical disks have been previously popular with CDs (Compact Disks), DVDs (Digital Versatile Disks), BDs (Blue-ray Disks), magneto-optical disks such as MO (Magneto Optical Disks) and MD (Mini Disks), and others. To be compatible with such disks and disk cartridges, various types of disk drive device have appeared in the market.

The types of disk drive device are of directly loading a disk to a turntable visible from an open lid or cover of a chassis, of automatically loading a disk onto a turntable inside of a chassis when a disk tray carrying thereon the disk is retracted in a horizontal direction from the chassis, of directly loading a disk on a turntable equipped to a disk tray of such a type, of automatically loading a disk on a turntable only by an insertion of the disk from a disk insertion/removal port provided to the side surface of a chassis, i.e., slot-in type, and others.

The problem of a disk drive device specifically of retracting in a horizontal direction a disk tray carrying thereon an optical disk is that the device body is required to have a length at least equal to or longer than the diameter of the optical disk in the direction along which the disk tray is moved to slide. This is because the sliding movement of the disk tray in the horizontal direction transfers the optical disk across an insertion/removal position and a recording/reproduction position. At the insertion/removal position, the optical disk is inserted or removed, and at the recording/reproduction position, the optical disk is subjected to recording or reproduction of information signals. As such, with disk drive devices and electronic devices in which a disk tray slides in the depth direction of the device body, the depth dimension of the device body is required to be larger than the diameter of an optical disk. Therefore, even with a monitor device or others having been favorably reduced in thickness, once it is incorporated with such a disk drive device, the resulting monitor device turns out to have the thickness equal to or smaller than 12 cm, which is the diameter of a general optical disk.

As an example, refer to Patent Document 1 (JP-A-2003-85861).

SUMMARY OF THE INVENTION

It is thus desirable to provide a transfer mechanism in which, after a transfer body is placed on a transfer tray, the transfer tray retracts the transfer body up to a recording/reproduction position and with which the device body is not increased in thickness, and a transfer device and an electronic device incorporated with such a transfer mechanism.

According to a first embodiment of the present invention, there is provided a transfer mechanism that includes: a tray that includes a placement surface section on which a recording medium is placed, and retention means for keeping hold of the recording medium placed on the placement surface section, and is moved and rotated across an insertion/removal position at which the tray is faced toward the outside of a device body with the placement surface section being substantially horizontal and a recording/reproduction position at which the tray is housed in the device body with the placement surface section being substantially vertical; a clamp member that is supported inside of the device body to allow a main surface section thereof to move and rotate across a substantially-horizontal direction and a substantially-vertical direction, and clamps, with a support mechanism, the recording medium moved and rotated to the recording/reproduction position; and a movement mechanism that moves the tray.

According to a second embodiment of the present invention, there is provided a transfer device that includes: a device body; a tray that includes a placement surface section on which a recording medium is placed, and retention means for keeping hold of the recording medium placed on the placement surface section, and is moved and rotated across an insertion/removal position at which the tray is faced toward the outside of the device body with the placement surface section being substantially horizontal and a recording/reproduction position at which the tray is housed in the device body with the placement surface section being substantially vertical; a clamp member that is supported inside of the device body to allow a main surface section thereof to move and rotate across a substantially-horizontal direction and a substantially-vertical direction, and clamps, with a support mechanism, the recording medium moved and rotated to the recording/reproduction position; and a movement mechanism that moves the tray.

According to a third embodiment of the present invention, there is provided an electronic device that includes: a device body; a tray that includes a placement surface section on which a recording medium is placed, and retention means for keeping hold of the recording medium placed on the placement surface section, and is moved and rotated across an insertion/removal position at which the tray is faced toward the outside of the device body with the placement surface section being substantially horizontal and a recording/reproduction position at which the tray is housed in the device body with the placement surface section being substantially vertical; a clamp member that is supported inside of the device body to allow a main surface section thereof to move and rotate across a substantially-horizontal direction and a substantially-vertical direction, and clamps, with a support mechanism, the recording medium moved and rotated to the recording/reproduction position; and a movement mechanism that moves the tray. In the electronic device, the device body is incorporated, and an insertion/removal port is formed for insertion and removal of the tray.

According to a fourth embodiment of the present invention, there is provided a transfer mechanism that includes: a transfer tray that includes a placement surface section on which a transfer body is placed, and retention means for keeping hold of the transfer body placed on the placement surface section, and is moved and rotated across an insertion/removal position at which the transfer tray is faced toward the outside of a device body with the placement surface section being directed in a first direction, and at a housing position at which the transfer tray is housed in the device body with the placement surface section being directed in a second direction that is substantially orthogonal to the first direction; and a drive mechanism that moves and rotates the transfer tray.

According to a fifth embodiment of the present invention, there is provided a transfer device that includes: a device body; a transfer tray that includes a placement surface on which a transfer body is placed, and retention means for keeping hold of the transfer body placed on the placement surface section, and is moved and rotated across an insertion/removal position at which the transfer tray is faced toward the outside of the device body with the placement surface section being directed in a first direction, and at a housing position at which the transfer tray is housed in the device body with the placement surface section being directed in a second direction that is substantially orthogonal to the first direction; and a drive mechanism that moves and rotates the transfer tray.

According to a sixth embodiment of the present invention, there is provided an electronic device that includes: a device body; a transfer tray that includes a placement surface section on which a transfer body is placed, and retention means for keeping hold of the transfer body placed on the placement surface section, and is moved and rotated across an insertion/removal position at which the transfer tray is faced toward the outside of the device body with the placement surface section being directed in a first direction, and at a housing position at which the transfer tray is housed in the device body with the placement surface section being directed in a second direction that is substantially orthogonal to the first direction; and a drive mechanism that moves and rotates the transfer tray. In the electronic device, the device body is incorporated, and an insertion/removal port is formed for insertion and removal of the transfer tray.

With the transfer mechanism, the transfer device, and the electronic device of the embodiments of the invention, the transfer tray is moved and rotated across the insertion/removal position at which the placement surface section is directed in a first direction and at a housing position at which the placement surface section is directed in a second direction substantially orthogonal to the first direction. This accordingly enables to have a difference of substantially 90° between the direction of the placement surface at the insertion/removal position and the direction thereof at the housing position. As such, there is no more need to increase the thickness of the device body in the direction along which the placement surface of the transfer tray is located at the insertion/removal position, thereby favorably being able to reduce the thickness of the device in its entirety.

Also with the transfer mechanism, the transfer device, and the electronic device of the embodiments of the invention, the disk tray is provided with the retention member, and a disk is clamped at the recording/reproduction position. Such a configuration allows loading of the disk only by the disk being placed on the placement surface section, and unloading of the disk only removing as it is the disk from the placement surface section, thereby favorably easing loading and unloading of the disk. Moreover, during recording or reproduction, the disk tray is housed in the device body with the placement surface section being substantially vertical. Such a configuration allows provision of the tray insertion/removal port to the front surface of the device body, and the device body can be designed with the thickness equal to or smaller than the diameter of a disk.

DESCRIPTION OF THE PREFERRED EMBODIMENT

In the below, by referring to the accompanying drawings, a detailed description is given for a transfer mechanism, a transfer device, and an electronic device of an embodiment of the invention with an exemplary case of applying these to a disk drive device and a television unit equipped with the disk drive device.

Figure 1:
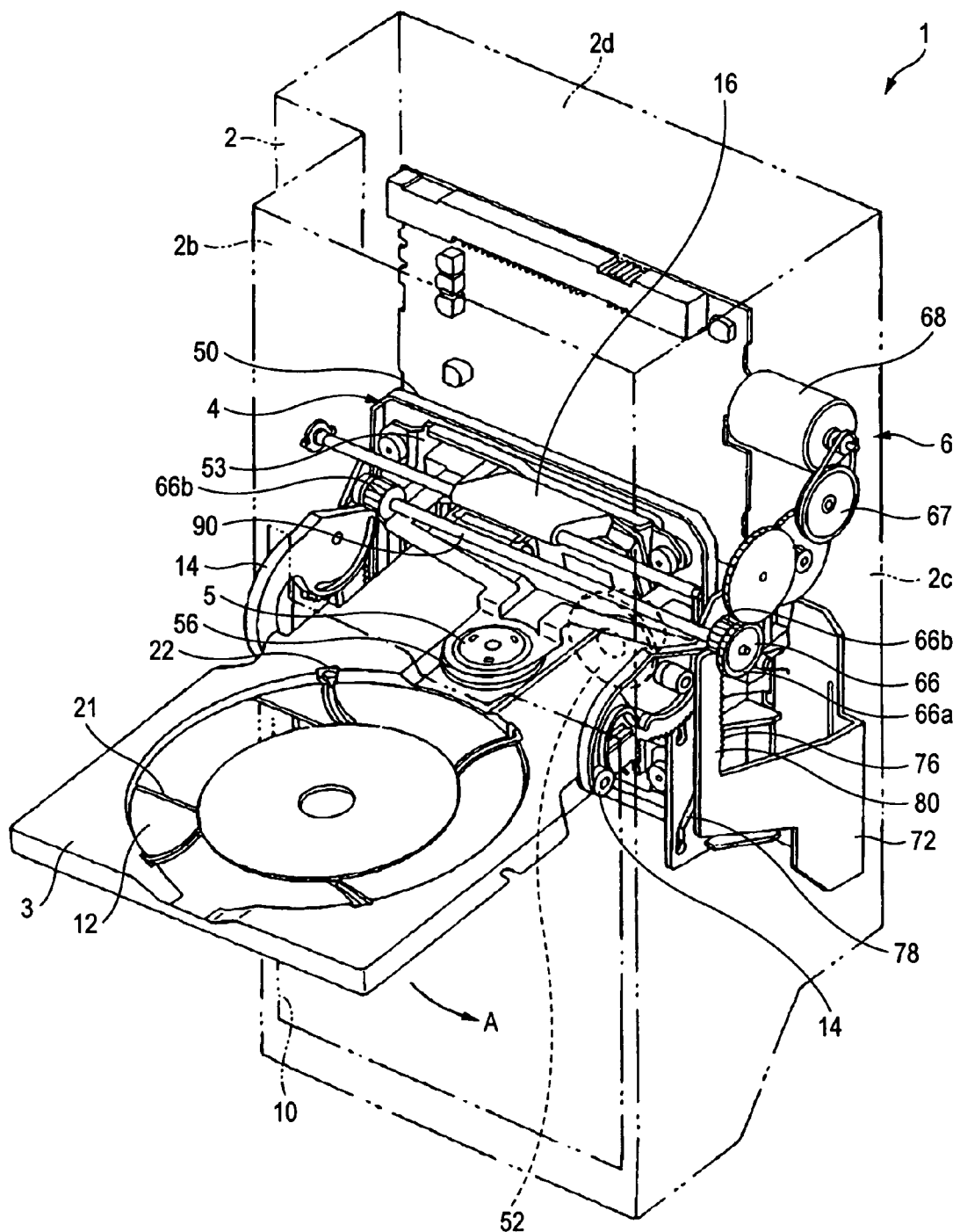
FIG. 1 is a perspective view of a disk drive device from which a disk tray is ejected.

As shown in FIG. 1, this disk drive device 1 includes an outer chassis 2 of a rectangular parallelepiped shape. The outer chassis 2 is configured to include a disk tray 3, an optical pickup unit 4, a clamper 5, and a drive mechanism 6. The optical pickup unit 4 performs recording and/or reproduction of information signals with respect to an optical disk transferred into the outer chassis 2 by the disk tray 3. The damper 5 clamps the optical disk together with a turntable 52 of the optical pickup unit 4. The drive mechanism 6 moves the disk tray 3 and the optical pickup unit 4.

Figure 2:
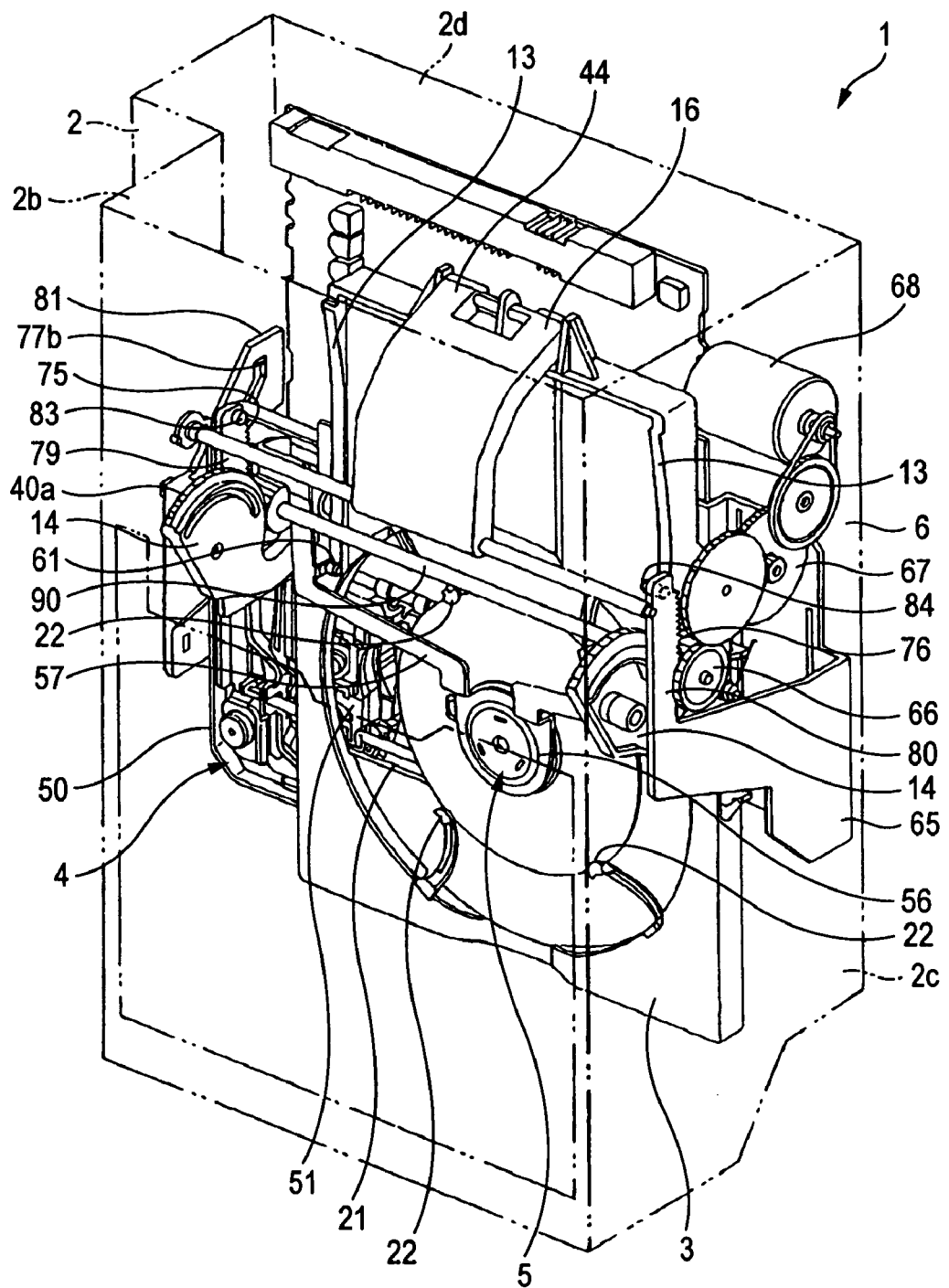
FIG. 2 is a perspective view of the disk drive device in which the disk tray is housed.
Figure 3A:
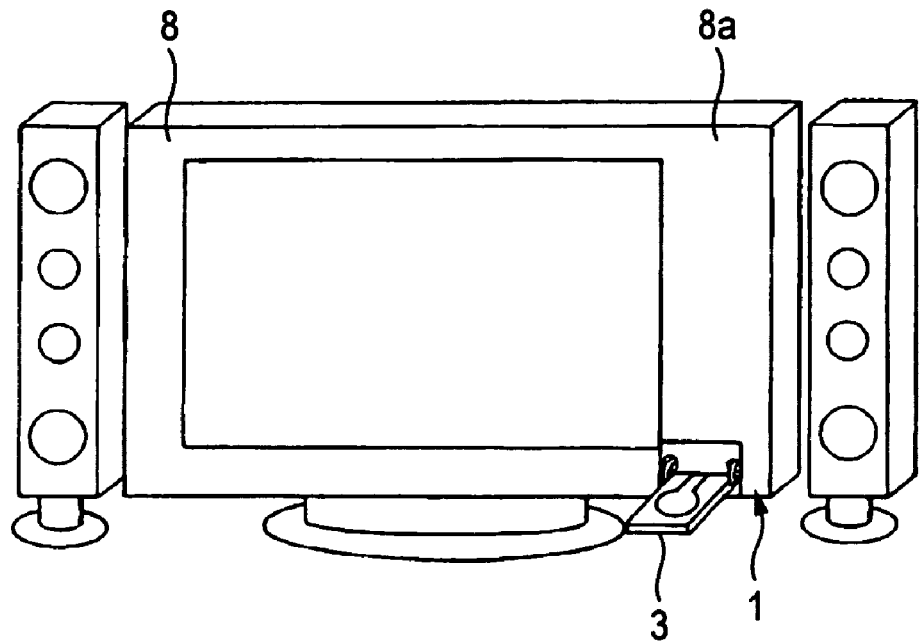
FIGS. 3A to 3C are each a diagram showing a television unit incorporated with the disk drive device.

In such a disk drive device 1, the disk tray 3 is supported to be able to move and rotate in a direction of an arrow A of FIG. 1, and in a direction opposite to the arrow A thereof. The disk tray 3 is moved and rotated from a tray insertion/removal port 10 to the outside of the outer chassis 2. The tray insertion/removal port 10 is the one provided to the lower portion of the front surface of the outer chassis 2. As shown in FIG. 2, the disk tray 3 is so operated as to be retracted into the outer chassis 2. As shown in FIG. 3A, the disk drive device 1 is incorporated into a part of a television unit 8, for example, and the disk tray 3 comes out from a front surface 8a of the device body with a placement surface section 12 being substantially horizontal. When an optical disk is placed on the disk tray 3, the disk tray 3 is retracted into the television unit 8 with the placement surface section 12 being substantially vertical. That is, in the disk drive device 1, the plane direction of the disk tray 3 at the insertion/removal position for the disk has a difference of substantially 90° from the plane direction thereof at the recording/reproduction position for the disk. This thus eliminates the need to form the disk drive device 1 thick in the plane direction of the disk tray 3 at the insertion/removal position. As such, in the television unit 8 equipped with the disk drive device 1, the optical disk is loaded to the optical pickup unit 4 while being substantially vertical, the television unit 8 can be thinner in thickness than the diameter of the optical disk. Another advantage is that the disk tray 3 is moved and rotated from the side of the front surface 8a, thereby allowing the close placement of peripheral equipment such as speaker on the right and left side surfaces of the television unit 8. Such a configuration also has no aperture portion or others on the upper surface, from which the dust often enters.

As shown in FIG. 1, the outer chassis 2 of such a disk drive device 1 is entirely of the shape of a substantially rectangular box, and a front surface 2a is formed with the tray insertion/removal port 10 for insertion or removal of the disk tray 3 thereto/therefrom. The tray insertion/removal port 10 is of a sufficient size for the placement surface section 12 of the disk tray 3 to move and rotate inside and outside of the outer chassis 2. In the outer chassis 2, right and left side surfaces 2b and 2c are each provided with a drive shaft 90, a drive motor 68 configuring the drive mechanism 6, or others, which will be described later.

Figure 4:
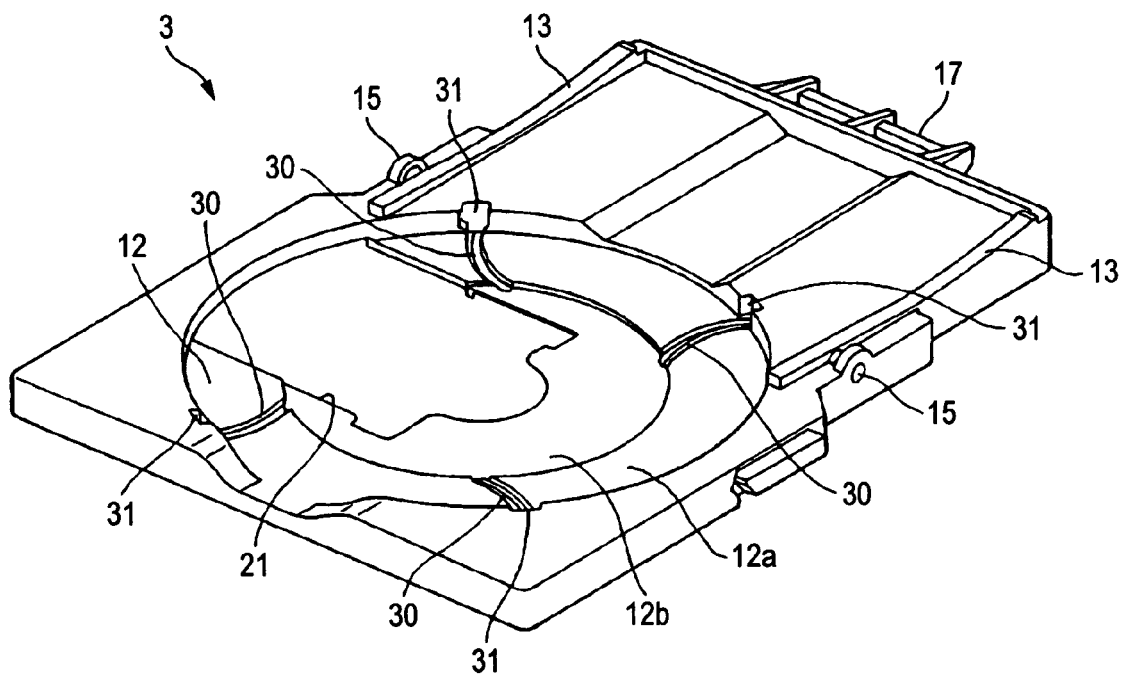
FIG. 4 is a perspective view of the disk tray.

As shown in FIG. 4, the disk tray 3 is formed like a flat rectangular plate in its entirety, and the plane section thereof is formed with the placement surface section 12 and a bank section 13. The placement surface section 12 is placed thereon with an optical disk, and the damper 5 that will be described later slides in contact with the bank section 13. The side surface sections of the disk tray 3 are each formed with a first move-and-rotate support section 15 for attachment of a move-and-rotate arm 14, and the rear surface section thereof is formed with a second move-and-rotate support section 17 for attachment of a move-and-rotate support piece 16.

The placement surface section 12 is the place where an optical disk is placed, and is formed with a circular concave section on the plane section from the center toward the front. The placement surface section 12 is formed with a large-diameter concave portion 12a for an optical disk of a large diameter, e.g., diameter of about 12 cm, and in the large-diameter concave portion 12a, a small-diameter concave portion 12b is concentrically formed for an optical disk of a small diameter, e.g., diameter of about 8 cm. The small-diameter concave portion 12b is formed at the level lower than the large-diameter concave portion 12a. The placement surface section 12 is formed with a pickup aperture section 21 from the center portion toward the left-side surface side through which a pickup base 51 of the optical pickup unit 4 is faced to the signal recording surface of the optical disk.

The placement surface section 12 is formed with a guide groove 30 and a shelter concave section 31. The guide groove 30 moves and rotates, on the placement surface section 12, a retention arm 23 of a retention member 22 that will be described later. The shelter concave section 31 moves the retention arm 23 away from the placement surface section 12 for shelter.

By being driven by the drive mechanism 6 that will be described later, such a disk tray 3 is ejected to the outside from the tray insertion/removal port 10 of the outer chassis 2. The disk tray 3 is then moved and rotated across the insertion/removal position (FIG. 1) where the placement surface section 12 is being substantially horizontal and the recording/reproduction position (FIG. 2) where the placement surface section 12 is substantially vertical. At the recording/reproduction position, the disk tray 3 is housed inside of the outer chassis 2. In the disk tray 3, a user places or takes out an optical disk on or from the placement surface section 12 at the insertion/removal position, and at the recording/reproduction position, the optical disk is chucked by the optical pickup unit 4 and the clamper 5 to be able to rotate.

The placement surface section 12 is provided with the retention member 22 for keeping hold of an optical disk and preventing it from falling off when the placement surface section 12 is made substantially vertical as a result of the disk tray 3 being moved and rotated to the recording/reproduction position. The retention member 22 keeps hold of the optical disk by supporting the perimeter surface thereof, and is configured to include the retention arm 23, a rotor 24, and a drive motor 25. The retention arm 23 moves and rotates inside of the large-diameter concave portion 12a in accordance with the diameter difference between a large-diameter disk and a small-diameter disk. The rotor 24 moves and rotates the retention arm 23 by being rotated on the underside surface section of the disk tray 3. The drive motor 25 drives the rotor 24 to rotate.

Figure 5:
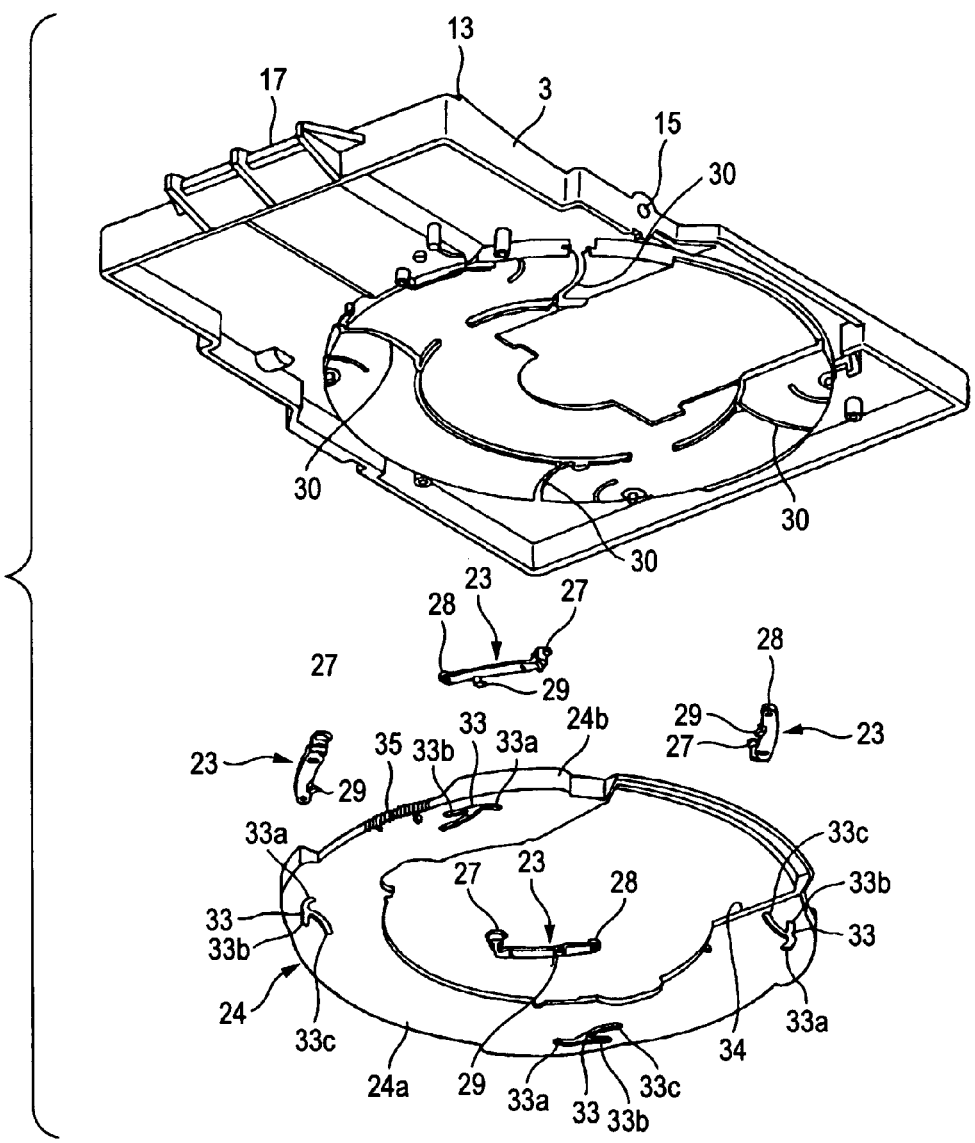
FIG. 5 is a perspective view of a retention member provided to the underside of the disk tray.
Figure 6:
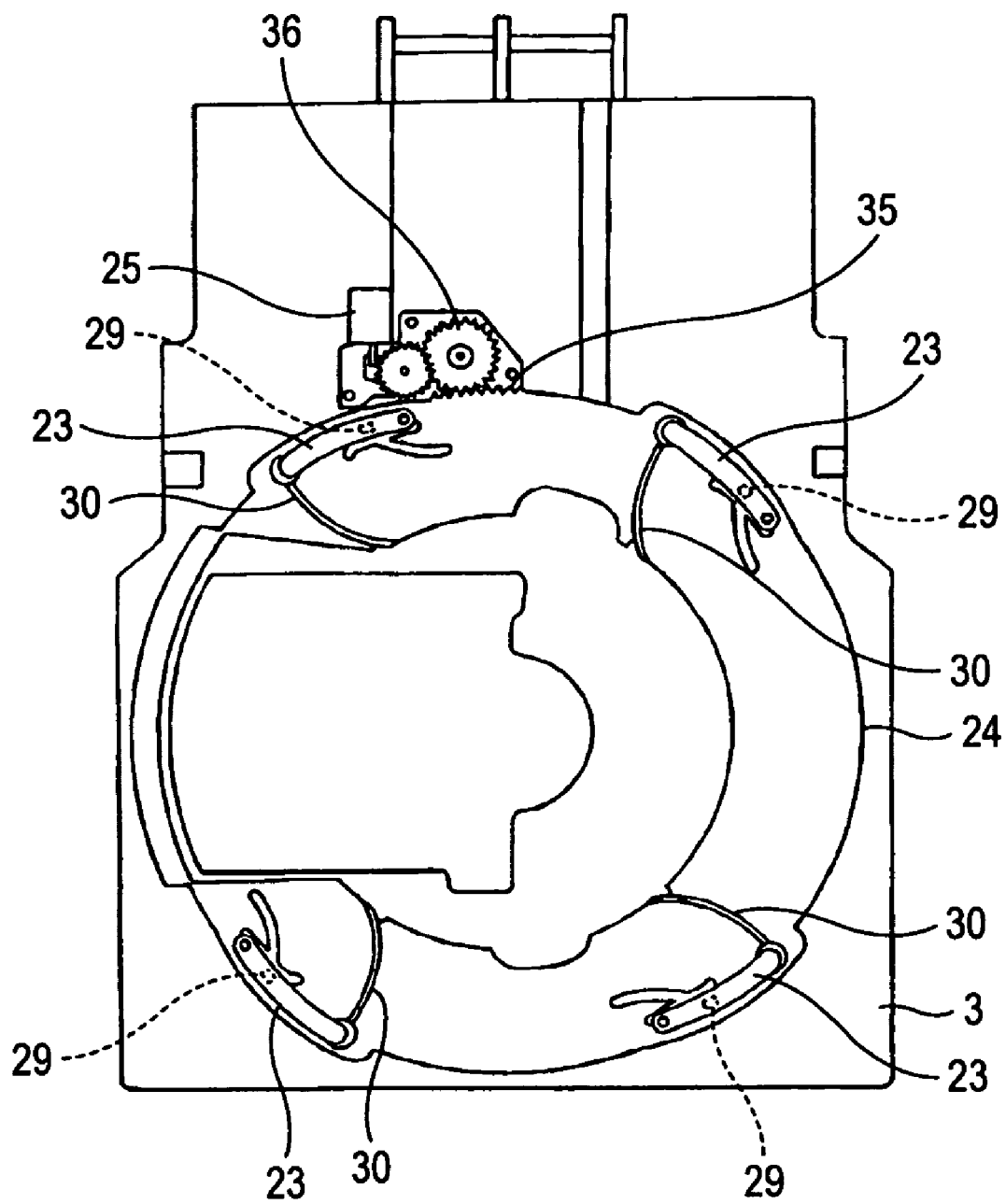
FIG. 6 is a plan view of the disk tray.

As shown in FIGS. 5 and 6, the retention arm 23 is made of a flat plate member in the shape of a substantially arc. The retention arm 23 is formed with, at one end, a support section 27 for supporting the perimeter surface of an optical disk, and at the other end, a fulcrum section 28 to be attached to the underside portion of the disk tray 3 to be able to freely move and rotate. Between the support section 27 and the fulcrum section 28, a guide convex section 29 is formed to be guided by the rotor 24. In the retention arm 23, with the configuration that the fulcrum section 28 is being attached to the underside of the disk tray 3 to be able to freely move and rotate, the support section 27 is protruded above the placement surface section 12 from the guide groove 30 and the shelter concave section 31 formed inside of the large-diameter concave portion 12a. The support section 27 is thus allowed to move along the guide groove 30 on the large-diameter concave portion 12a. Also in the retention arm 23, the support section 27 is biased, by a coil spring that is not shown, to be able to move and rotate in the center direction of the placement surface section 12 supporting the perimeter section of the optical disk. With the guide convex section 29 being guided by the rotor 24, the retention arm 23 is restricted to move and rotate in accordance with the size of the optical disk placed on the placement surface section 12. Accordingly, the retention arm 23 supports the perimeter surface of the optical disk when it is being transferred, and moves away from the perimeter surface when the optical disk is being subjected to recording or reproduction or being inserted into or removed from the disk tray 3.

The rotor 24 serving to guide the retention arm 23 is shaped like a disk, and attached to the underside of the disk tray 3 to be able to freely rotate. This rotor 24 is configured to include, on a main surface portion 24a, a move-and-rotate restriction groove 33 and a pickup aperture section 34. The move-and-rotate restriction groove 33 is inserted with the guide convex section 29 of the retention arm 23, and the pickup aperture section 34 is corresponding to the pickup aperture section 21 of the disk tray 3. As shown in FIG. 6, the rotor 24 is formed with a rack 35 to a part of a perimeter surface 24b, and the rack 35 is coupled to the drive motor 25 via a drive gear string 36.

The move-and-rotate restriction groove 33 is the one for moving and rotating the retention arm 23 by guiding the guide convex section 29 in response to the movement and rotation of the rotor 24. The move-and-rotate restriction groove 33 is configured to include a shelter groove portion 33a, a first support groove portion 33b, and a second support groove portion 33c. The shelter groove portion 33a makes the retention arm 23 to take shelter to the shelter concave section 31, the first support groove portion 33b makes the retention arm 23 to support the perimeter surface of a large-diameter disk, and the second support groove portion 33c makes the retention arm 23 to support the perimeter surface of a small-diameter disk.

The shelter groove portion 33a is formed in the vicinity of the perimeter surface 24b of the rotor 24, and when the guide convex section 29 is guided, moves and rotate the retention arm 23 in such a manner that the support section 27 takes shelter from the guide groove 30 to the shelter concave section 31. The first support groove portion 33b is formed along the perimeter surface 24b of the rotor 24 to be slightly inside of the shelter groove portion 33a, and when the guide convex section 29 is guided, moves and rotates the retention arm 23 in such a manner that the support section 27 comes in contact with the perimeter surface of a large-diameter disk. The second support groove portion 33c is formed more inwardly than the shelter groove portion 33a, and when the guide convex section 29 is guided, moves and guides the retention arm 23 in such a manner that the support section 27 comes in contact with the perimeter surface of a small-diameter disk.

The rack 35 is coupled with the drive gear string 36 and the drive motor 25 attached to the underside of the disk tray 3. With such coupling, the rotor 24 is rotated in one or the other direction in response when the drive motor 25 is driven in a forward or reverse direction.

In such a retention member 22, when the disk tray 3 is moved and rotated to be outside of the outer chassis 2, and when the placement surface section 12 is moved and rotated to the insertion/removal position at which the placement surface section 12 is substantially vertical, the rotor 24 is rotated, and the guide convex section 29 is guided by the shelter groove portion 33a of the move-and-rotate restriction groove 33. In response thereto, the retention arm 23 is moved and rotated in such a manner that the support section 27 is allowed to take shelter to the shelter concave section 31 formed to the placement surface section 12. As a result, the support section 27 moves away from the placement surface section 12 for shelter, thereby allowing the placement thereon of a large- or small diameter disk.

Figure 7:
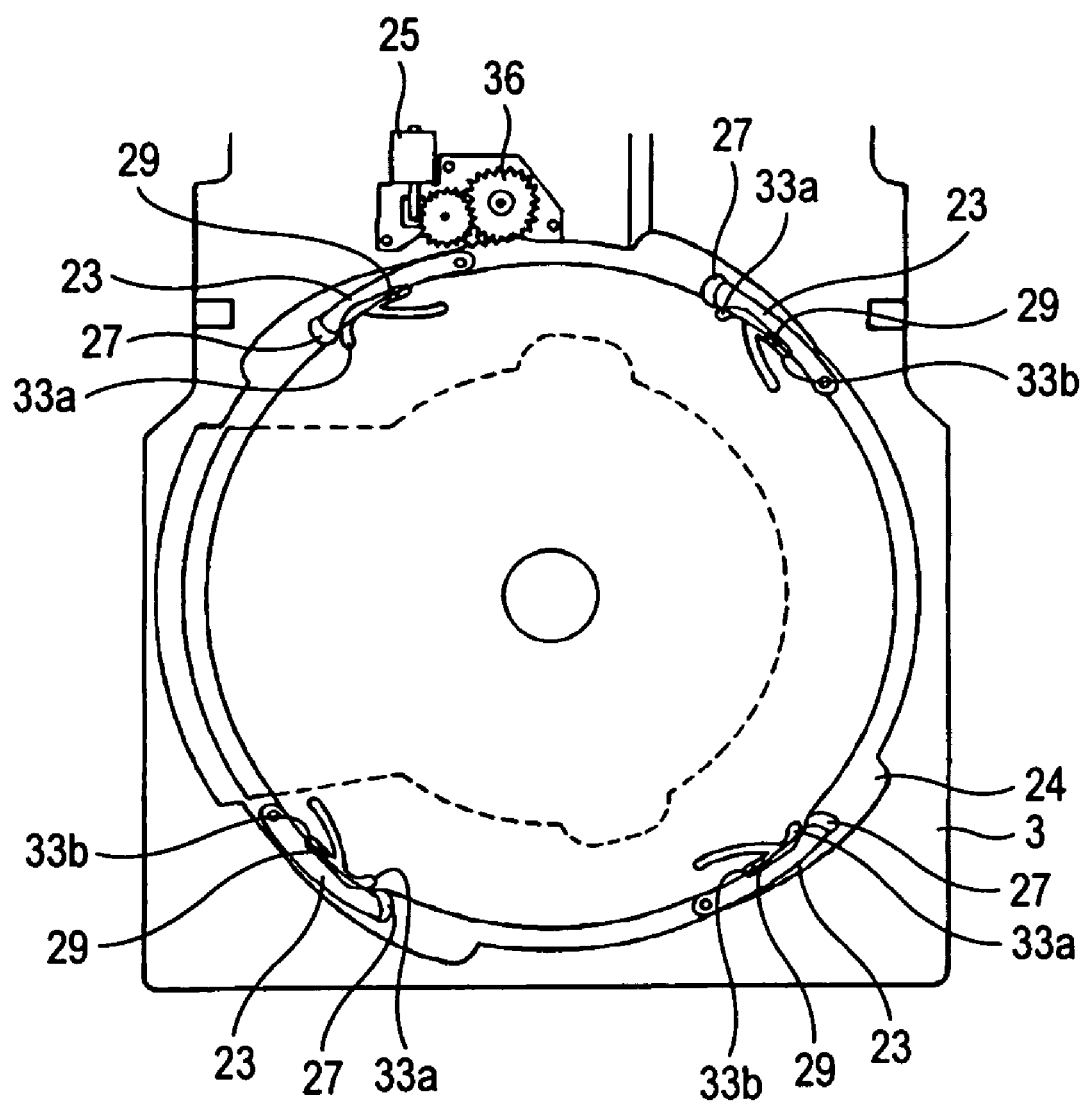
FIG. 7 is a plan view of the disk tray with a retention arm supporting a large-diameter disk.
Figure 8:
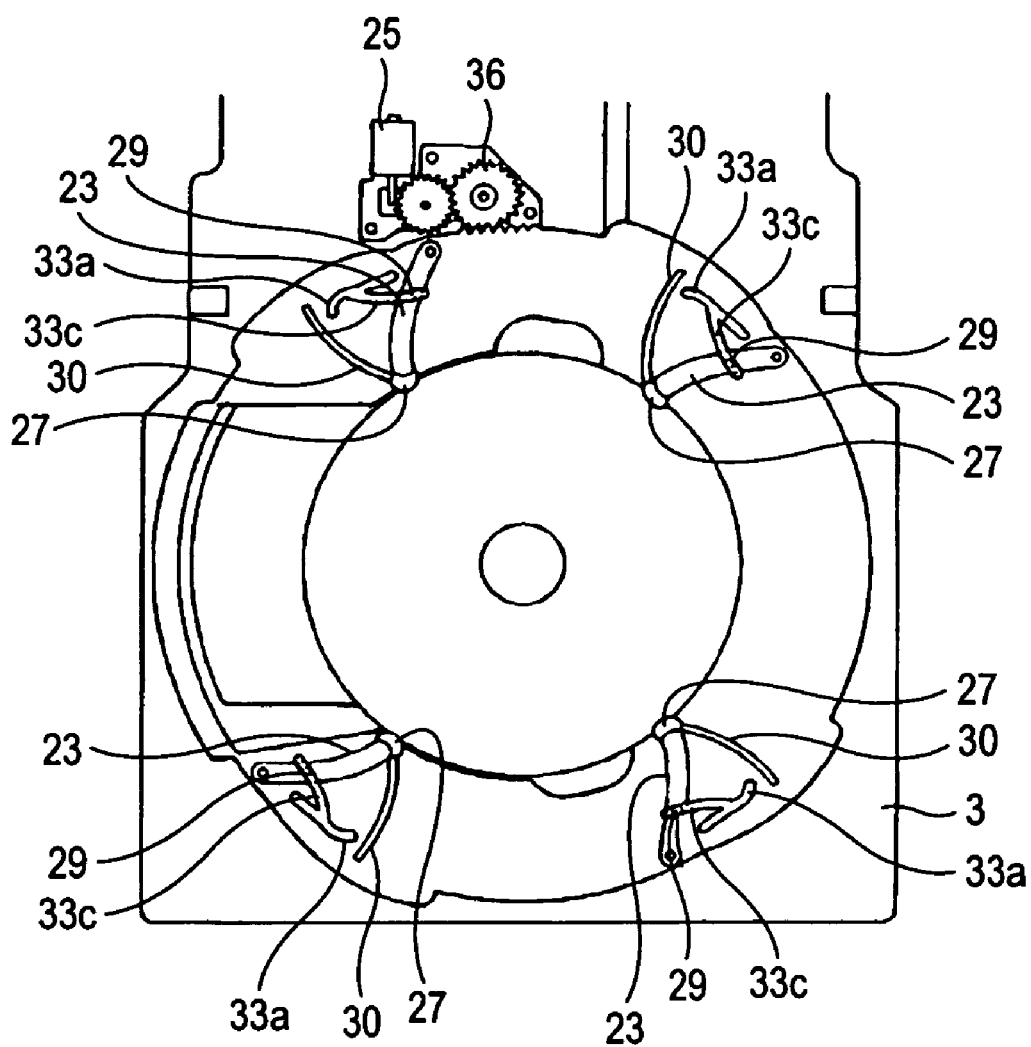
FIG. 8 is a plan view of the disk tray with the retention arm supporting a small-diameter disk.

When the disk tray 3 is started to be moved and rotated toward the recording/reproduction position at which the placement surface section 12 thereof is substantially horizontal from the insertion/removal position, in the retention member 22, the drive motor 25 is driven so that the rotor 24 is started to be rotated, and the guide convex section 29 is guided by the first or second support groove portion 33b or 33c of the move-and-rotate restriction groove 33 so that the support section 27 comes in contact with the perimeter surface of the optical disk. When the optical disk placed on the placement surface section 12 is of a large diameter, as shown in FIG. 7, the support section 27 coming in contact with the perimeter surface of the disk restricts the movement and rotation of the retention arm 23 in the inward direction, whereby the guide convex section 29 is guided from the shelter groove portion 33a to the first support groove portion 33b. As such, the retention arm 23 supports the perimeter surface of the large-diameter disk, and the large-diameter disk can be protected thereby not to fall off from the placement surface section 12. On the other hand, when the optical disk placed on the placement surface section 12 is of a small diameter, as shown in FIG. 8, in the retention arm 23 that has been biased to move and rotate in the inward direction of the placement surface section 12, the guide convex section 29 is allowed to move and rotate from the shelter groove portion 33a to the second support groove portion 33c, and the support section 27 moves through the guide groove 30 toward the side of the small-diameter concave portion 12b. As such, the retention arm 23 supports the perimeter surface of the small-diameter disk, and the small-diameter disk can be protected thereby not to fall off from the placement surface section 12.

After the disk tray 3 is moved and rotated to the recording/reproduction position, and after the optical disk is clamped by the turntable 52 and the damper 5, similarly to the above, in the retention arm 23, the support section 27 is moved to the shelter concave section 31 for shelter by the guide convex section 29 being guided from the first or second support groove portion 33b or 33c to the shelter groove portion 33a. As such, in the retention arm 23, the support section 27 is moved away from the perimeter surface of the optical disk, thereby allowing the optical disk to be able to rotate.

When a command comes for ejection of the optical disk, similarly to the above, in the retention arm 23, the guide convex section 29 is guided from the shelter groove portion 33a to the first or second support groove portion 33b or 33c, whereby the support section 27 supports the perimeter surface of the optical disk. After the optical disk is supported as such by the retention arm 23, the disk tray 3 is moved and rotated from the recording/reproduction position to the insertion/removal position.

When the disk tray 3 is moved and rotated from the recording/reproduction position to the insertion/removal position, the rotor 24 is rotated in the reverse direction. Accordingly, in the retention arm 23, the guide convex section 29 is thus moved from the first or second support groove portion 33b or 33c to the shelter groove portion 33a. In response, in the retention arm 23, the support section 27 moves away from the guide groove 30 for shelter to the shelter concave section 31, i.e., moves away from the perimeter surface of the optical disk. As such, the optical disk is loaded or unloaded to/from the placement surface section 12.

The disk tray 3 is formed with the bank section 13 from the placement surface section 12 toward the rear surface side for the clamper 5 to slide in contact therewith. The bank section 13 is formed to both right and left sides of the disk tray 3, and has the shape of a substantially arc, i.e., gradually bulging from the main surface section toward the rear surface direction. Such a bank section 13 serves to keep a clearance between the damper 5 and the optical disk placed on the placement surface section 12. By a cam roller 61 provided to a clamp arm 57 of the damper 5 moving to slide in contact, the damper 5 is prevented from coming in contact with the placement surface section 12 and the optical disk while the disk tray 3 is being moved and rotated between the insertion/removal position and the recording/reproduction position. As such, without sliding in contact with the placement surface section 12 of the disk tray 3 and the signal recording area of the optical disk while the disk tray 3 is being moved and rotated, the damper 5 is brought to come in contact with the area close to the center hole of the optical disk after the disk tray 3 is moved and rotated to the recording/reproduction position.

The disk tray 3 is formed with, on both side surface sections, a pair of first move-and-rotate support sections 15 and 15, respectively. The first move-and-rotate support sections 15 and 15 are each attached with, to be able to freely move and rotate, the move-and-rotate arm 14 configuring the drive mechanism 6. The disk tray 3 is formed with the second move-and-rotate support section 17 on the rear surface section. The second move-and-rotate support section 17 is attached with, to be able to freely move and rotate, the move-and-rotate support piece 16 configuring the drive mechanism 6. When the move-and-rotate arms 14 are operated to move and rotate by the drive mechanism 6 being driven, the disk tray 3 is accordingly moved and rotated between the insertion/removal position and the recording/reproduction position while being supported by the move-and-rotate support piece 16 on the rear surface side.

Figure 9:
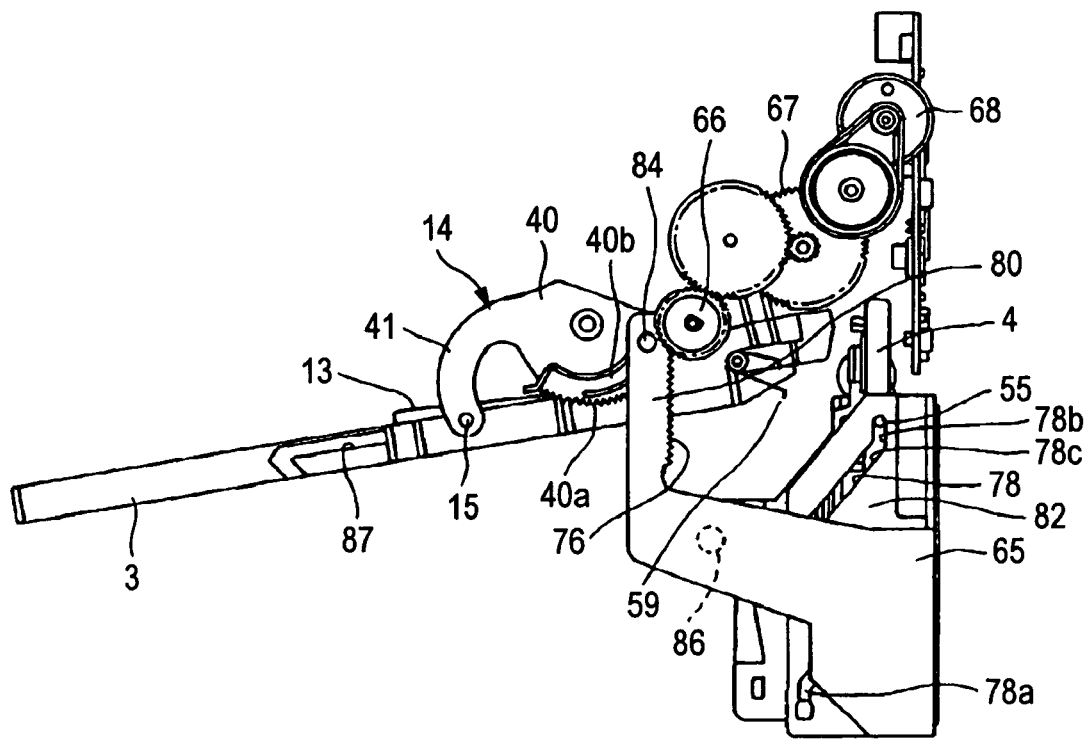
FIG. 9 is a side view of the disk drive device in which the disk tray is moved and rotated to an insertion/removal position, and a base chassis is moved to a chucking-release position for shelter.

As shown in FIG. 9, the move-and-rotate arm 14 is configured to include a body section 40 of a semicircle shape, and an arm section 41 protruding in the form of an arc from a part of the body section 40. The body section 40 is each attached to right and left side walls 2b and 2c of the outer chassis 2 to be able to rotate, and is formed with a rack portion 40a and an engagement groove 40b along the rotation direction. The arm section 41 is formed with, at the tip end, an engagement convex section for engagement with the first move-and-rotate support section 15 of the disk tray 3. In the move-and-rotate arm 14, when the body section 40 is rotated, the arm section 41 is moved and rotated across inside and outside of the tray insertion/removal port 10 of the outer chassis 2.

Figure 10:
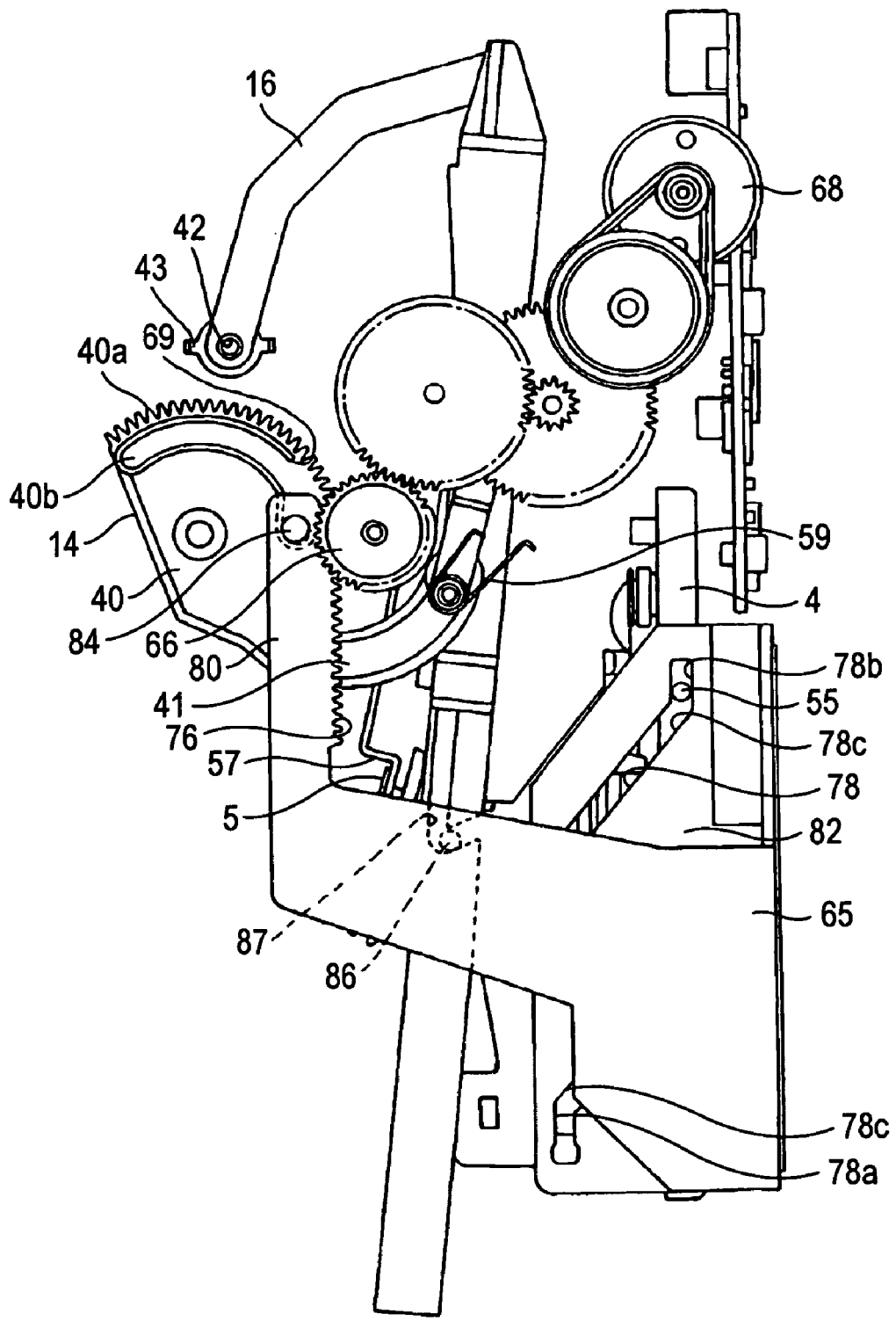
FIG. 10 is a side view of the disk drive device in which mesh change is made between a move-and-rotate arm and an up-and-down rack with respect to a drive gear.
Figure 14:
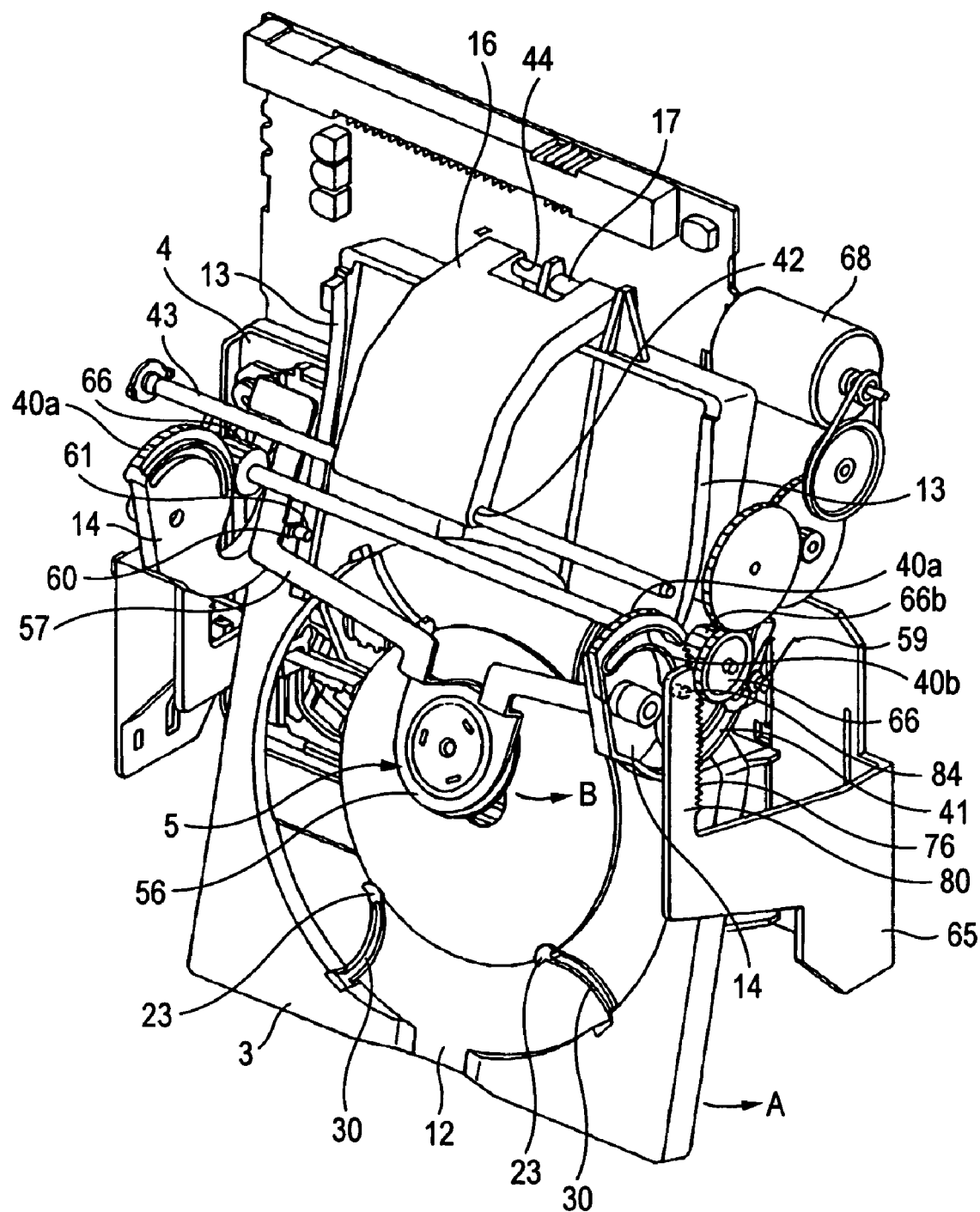
FIG. 14 is a perspective view of the disk drive device in which mesh change is made between the move-and-rotate arm and the up-and-down rack with respect to the drive gear.

As shown in FIG. 10, the move-and-rotate support piece 16 is a flat plate member formed in substantially L-shape, and is formed with, on one end side in the longitudinal direction, a shaft hole 42 penetrating through the width direction. Through the shaft hole 42, a spindle 43 is inserted after passing through the both side surface walls of the outer chassis 2. As shown in FIG. 14, the move-and-rotate support piece 16 is also formed with a latch section 44 at the other end side in the longitudinal direction, and the latch section 44 is latched at the second move-and-rotate support section 17 of the disk tray 3 to be able to freely move and rotate. When the move-and-rotate support piece 16 is rotated about the spindle 43 inserted into the shaft hole 42, the latch section 44 responsively moves and rotates inside of the outer chassis 2.

With the support by such a pair of right and left move-and-rotate arms 14 and the move-and-rotate support piece 16 on the both side surfaces and the rear surface, the disk tray 3 is supported biaxially. As such, the posture of the disk tray 3 is defined when it is at the insertion/removal position, at the recording/reproduction position, and at the position therebetween. By being biaxially supported as such by a pair of right and left move-and-rotate arms 14 and the move-and-rotate support piece 16 each moving and rotating in an arc, the disk tray 3 is moved and rotated in an arc between the insertion/removal position and the recording/reproduction position.

As shown in FIG. 1, the optical pick up unit 4 performing recording and/or reproduction of information signals with respect to an optical disk transferred to the recording/reproduction position is provided with a base chassis 50 in the shape of substantially a rectangular this base chassis 50 is provided thereon with a base frame 53 for supporting the pickup base 51 and the turntable 52. The base chassis 50 being substantially rectangular is disposed in the outer chassis 2 in such a manner that the main surface is directed in the horizontal direction. The base chassis 50 is formed with, on each of the right and left side surfaces, a guide shaft 55 with a space in the vertical direction for operation by the drive mechanism 6.

Figure 11:
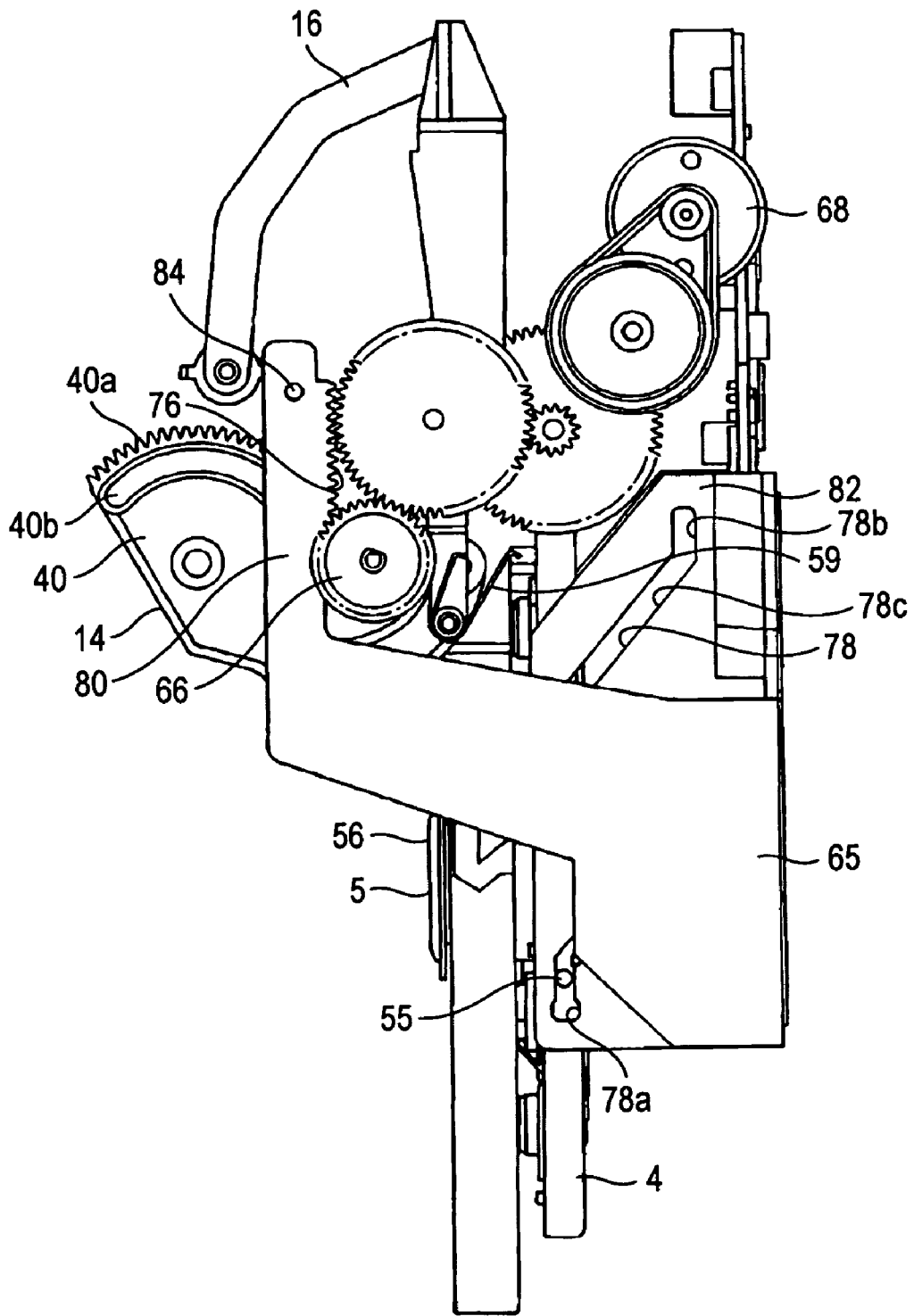
FIG. 11 is a side view of the disk drive device in which the disk tray is moved and rotated to a recording/reproduction position, and a base chassis is moved to a chucking position for shelter.

The base frame 53 is disposed on the base chassis 50 via a damper, and is transferred together with the base chassis 50 by the drive mechanism 6 across the side of the front surface 2a of the outer chassis 2 and the side of the rear surface 2d thereof. When the base chassis 50 is transferred to the front surface side of the outer chassis 2, the base frame 53 is transferred to the chucking position where the turntable 52 provided therein chucks with the optical disk transferred to the recording/reproduction position (FIG. 11). On the other hand, when the base chassis 50 is transferred to the rear surface side of the outer chassis 2, the base frame 53 is transferred to the chucking-release position where the chucking between the turntable 52 and the optical disk is released (FIG. 10).

This base frame 53 is so disposed that a pair of guide shafts that are not described in detail are directed toward the side of the left side wall 2b of the outer chassis 2 from the vicinity of the turntable 52, and by these guide shafts, the pickup base 51 is supported to be able to freely slide. The base frame 53 is also so disposed that the turntable 52 is disposed toward the front surface side of the outer chassis 2, and is provided with a spindle motor for rotating the turntable 52.

When the disk tray 3 is moved and rotated from the recording/reproduction position to the insertion/removal position, as shown in FIG. 9, the optical pickup unit 4 is moved away by the drive mechanism 6 for shelter to the chucking-release position at which the base chassis 50 is located on the side of the rear surface 2d of the outer chassis 2. When an optical disk is placed on the placement surface section 12, and when the disk tray 3 is moved and rotated from the insertion/removal position to the recording/reproduction position, as shown in FIG. 11, the base chassis 50 is moved by the drive mechanism 6 to the chucking position, i.e., on the side of the front surface 2a of the outer chassis 2, and with the clamper 5, keeps hold of the optical disk together on the turntable 52. Thereafter, the turntable 52 is rotated by the spindle motor, and pickup base 51 performs writing and reading of information signals. Note that the rear surface side of the outer chassis 2 is provided with a flexible wiring board connected to the pickup base 51, and a main substrate provided with various types of circuits, connection connectors, and others.

The damper 5 clamping an optical disk together with the turntable 52 supported by the base frame 53 is configured to include a clamp plate 56 and a clamp arm 57. The clamp plate 56 serves to clamp the optical disk at its area in the vicinity of the center hole together with the turntable 52, and the clamp arm 57 serves to keep hold of the clamp plate 56.

The clamp plate 56 is a resin-made disk, and is attached to the clamp arm 57. By being attached to the clamp arm 57 as such, the clamp plate 56 is allowed to come close to or move away from the optical-disk-carrying turntable 52 in response to the movement and rotation of the clamp arm 57.

The clamp arm 57 is made of a sheet metal whose substantially center portion is bulging in the width direction. The bulging end is attached with the clamp plate 56 corresponding to the turntable 52 disposed to the base frame 53. Moreover, with the configuration that move-and-rotate shafts (not shown) protruding from the both end portions of the clamp arm 57 in the longitudinal direction are inserted, for supporting, into the side walls 2b and 2c of the outer chassis 2, the clamp arm 57 is allowed to move and rotate inside of the outer chassis 2 about these move-and-rotate shafts. Also by these move-and-rotate shafts being wound by a coil spring 59, in the clamp arm 57, the clamp plate 56 is always biased to move and rotate in the direction of an arrow B in FIG. 12, i.e., in the direction the clamp plate 56 comes close to the turntable 52.

As shown in FIG. 14, the clamp arm 57 is provided with a cam piece 60, which is protruding from the area in the vicinity of each of the both end portions in the longitudinal direction to slide in contact with the bank section 13 of the disk tray 3. The cam piece 60 is provided with a cylindrical-shaped cam roller 61 at the tip end, and this cam roller 61 slides in contact with the bank section 13. Such cam pieces 60 are provided to allow the clamp plate 56 to have a fixed distance from an optical disk placed on the placement surface section 12 by the cam roller 61 sliding in contact with the bank section 13. That is, unlike the clamp arm 57 moved and rotated by being supported only by the move-and-rotate shaft, i.e., by uniaxially, the disk tray 3 described above is moved and rotated in the shape of an arc by being supported by both the move-and-rotate arms 14 and the move-and-rotate support piece 16, i.e., by biaxially. As such, the move-and-rotate path of the clamp plate 56 is moved from the area in the vicinity of the center hole of the optical disk placed on the placement surface section 12 to the signal recording area. Moreover, because the clamp arm 57 is biased to move and rotate to the side of the placement surface section 12 by the coil spring 59 wound around the move-and-rotate shaft, there is a possibility that the clamp plate 56 may slide in contact with the signal recording area of the optical disk while the disk tray 3 is being transferred.

Figure 12:
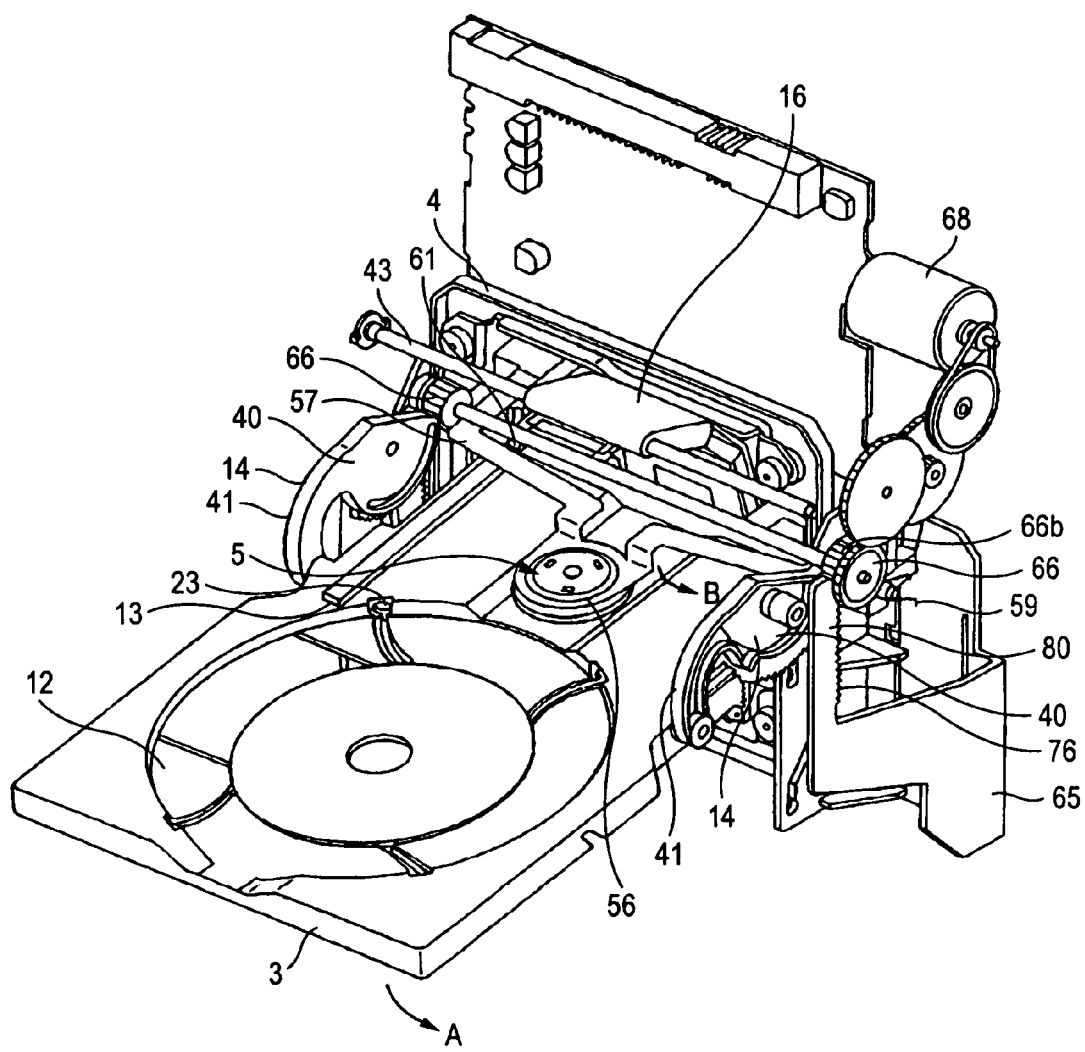
FIG. 12 is a perspective view of the disk drive device in which the disk tray is moved and rotated to the insertion/removal position.

For prevention of such sliding, the clamp arm 57 of the camper 5 is provided with the cam pieces 60, and the disk tray 3 is provided with the bank section 13. With such a configuration, other than when the disk tray 3 is moved and rotated to the recording/reproduction position, the cam roller 61 is made to slide in contact with the bank section 13, thereby successfully preventing the clamp plate 56 from coming in contact with an optical disk placed on the placement surface section 12. To be more specific, as shown in FIG. 12, when the disk tray 3 is being moved and rotated to the insertion/removal position, the clamp plate 56 of the damper 5 is retained at the position with a predetermined distance from the placement surface section 12 because the cam roller 61 is positioned on the bank section 13. Note that, at this time, against the biasing force of the coil spring 59, the damper 5 is being moved and rotated in the direction opposite to the arrow B with which the clamp plate 56 is horizontal. Moreover, as is moved and rotated inside of the outer chassis 2, the damper 5 is never exposed to the outside. Moreover, as is always under the biasing force of the coil spring 59 in the direction of the arrow B, the clamper 5 is moved and rotated without rattling in response to the movement and rotation of the disk tray 3.

Figure 13:
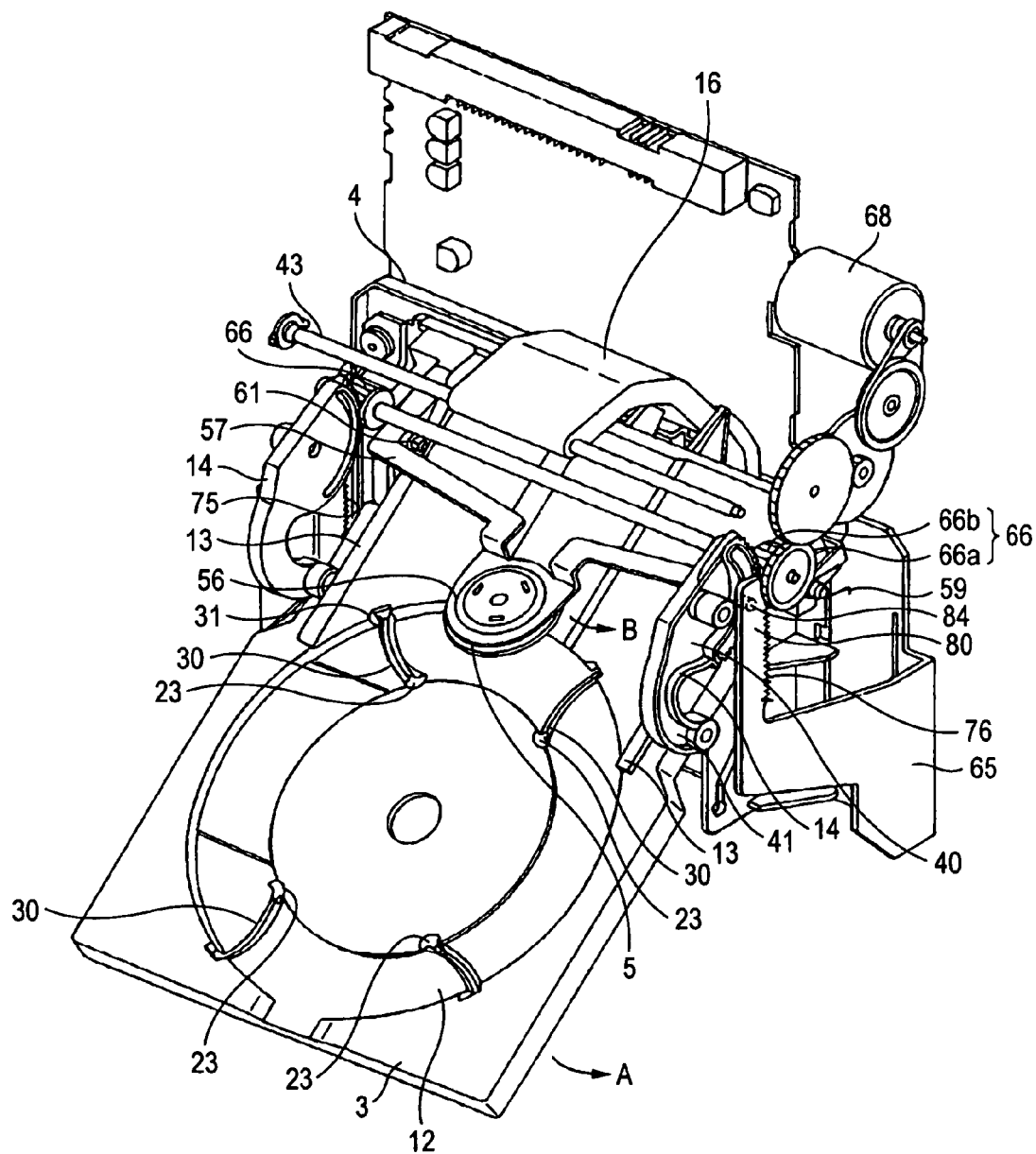
FIG. 13 is a perspective view of the disk drive device in which the disk tray is moved and rotated between the insertion/removal position and the recording/reproduction position.
Figure 15:
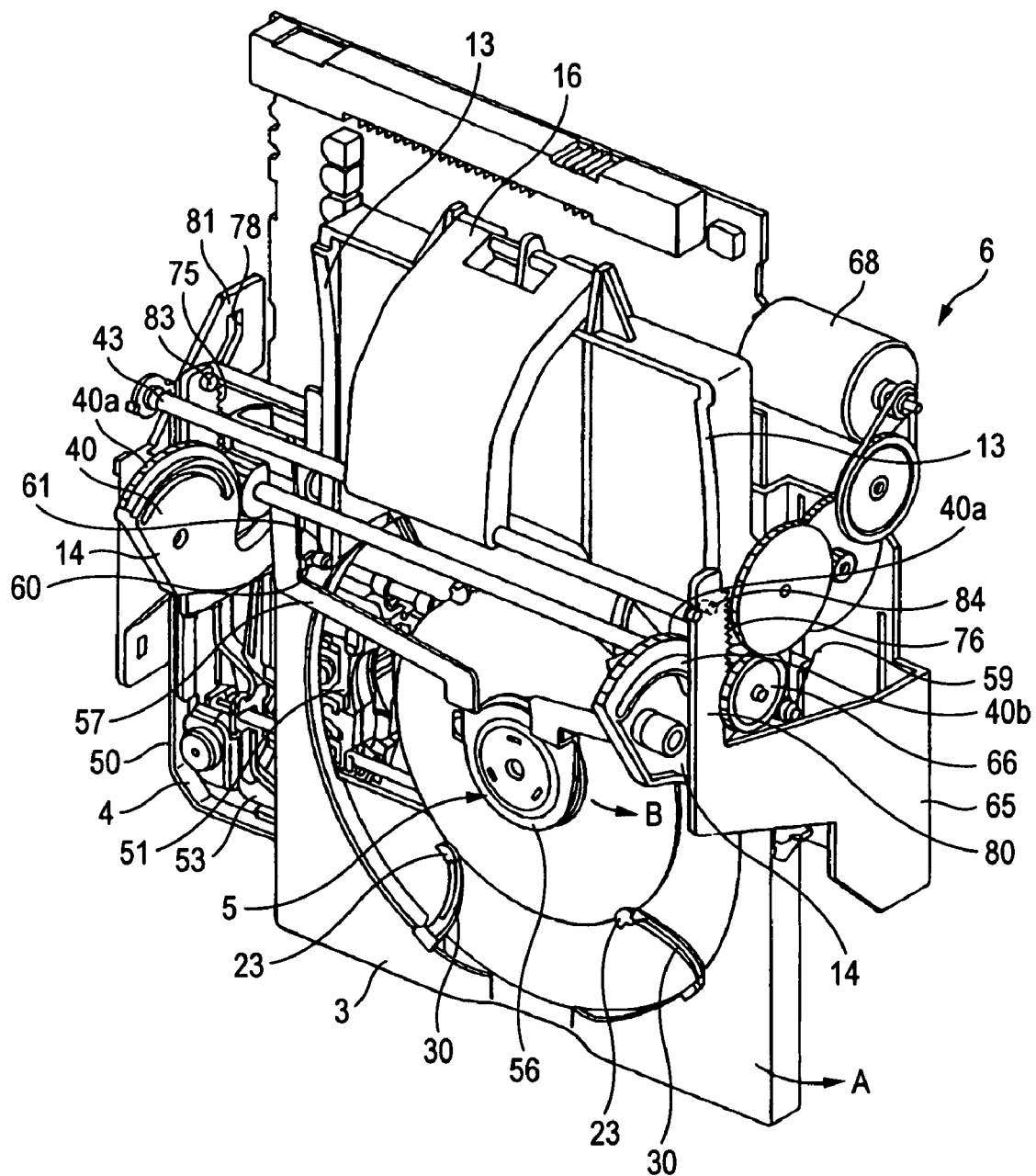
FIG. 15 is a perspective view of the disk drive device in which the disk tray is moved and rotated to the recording/reproduction position, and the base chassis is moved to the chucking position for shelter.

When the disk tray 3 is moved and rotated from the insertion/removal position to the recording/reproduction position, as shown in FIGS. 13 and 14, the damper 5 is moved and rotated in the direction of the arrow B while the cam roller 61 sliding in contact with the bank section 13. Also in this case, the damper 5 is moved and rotated while the clamp plate 56 is being retained at a position away from the placement surface section 12. As shown in FIG. 15, thereafter, when the disk tray 3 is moved and rotated to the recording/reproduction position, the clamp plate 56 is faced to the center hole of an optical disk placed on the placement surface section 12, and the cam roller 61 is moved away for shelter from the bank section 13. Therefore, the clamper 5 becomes able to clamp, together with the turntable 52, the optical disk by the clamp plate 56 being biased to move and rotate in the direction of the arrow B under the biasing force of the coil spring 59. At the time of recording and reproduction, the clamp plate 56 is rotated together with the optical disk by the turntable 52 being driven to rotate by the spindle motor.

When the disk tray 3 is moved and rotated from the recording/reproduction position to the insertion/removal position, the operation will be executed in the reverse order from the above, whereby the clamper 5 is moved and rotated in the direction opposite to the arrow B while the cam roller 61 sliding in contact with the bank section 13, and while the clamp plate 56 being retained at the position away from the placement surface section 12. This thus accordingly prevents the clamp plate 56 of the damper 5 from sliding in contact with the signal recording area of the optical disk.

Described next is the drive mechanism 6 for driving the disk tray 3 and the optical pickup unit 4. As shown in FIG. 1, the drive mechanism 6 is configured to include the move-and-rotate arms 14, the move-and-rotate support piece 16, a cam plate 65, a drive gear 66, and a drive motor 68. The move-and-rotate arms 14 and the move-and-rotate support piece 16 all support the disk tray 3, and the cam plate 65 moves the optical pickup unit 4 by cooperatively working with the move-and-rotate arms 14. The drive gear 66 drives all the move-and-rotate arms 14 and the cam plate 65, and the drive motor 68 is coupled with the drive gear 66 via a deceleration gear string 67.

As described above, the move-and-rotate arm 14 is provided with the semi-circle-shaped body section 40 and the arm section 41 extended in the form of an arc. In the move-and-rotate arm 14, the body section 40 is each latched to the side surface walls of the outer chassis 2 to be able to freely move and rotate. The body section 40 is formed with the rack portion 40a, and the engagement groove 40b to be engaged with the cam plate 65. The rack portion 40a rotates the move-and-rotate arm 14 by being meshed with the drive gear 66 ganged to the drive motor 68, and moves and rotates the disk tray 3 in the direction of the arrow A of FIG. 1 and in the direction opposite thereto. The engagement groove 40b serves to move upward the cam plate 65 to allow meshing with the drive gear 66 in response to the rotation of the move-and-rotate arm 14. This upward movement is made by the engagement groove 40b being engaged with each corresponding engagement convex section 83 or 84 provided to the cam plate 65 to protrude therefrom. The engagement groove 40b is formed in the shape of an arc along the direction same as the rotation direction of the move-and-rotate arm 14. As shown in FIGS. 10 and 14, at the timing when the disk tray 3 is moved and rotated almost to the recording/reproduction position, one end portion of each of the engagement grooves 40b comes in contact with, from underneath, the engagement convex sections 83 and 84 of the cam plate 65. With such a configuration, when the move-and-rotate arms 14 are rotated to a further degree, the engagement grooves 40b pull upward the engagement convex sections 83 and 84, thereby being able to mesh the cam plate 65 with the drive gears 66. Note here that the engagement grooves 40b are each formed with an aperture section 69 for attachment/detachment of the engagement convex sections 83 and 84. After the engagement convex sections 83 and 84 are pulled upward, when the engagement convex sections 83 and 84 are moved upward from the aperture section 69 together with the cam plate 65, the engagement with the engagement grooves 40b is released, and when the cam plate 65 is moved down, the engagement convex sections 83 and 84 are engaged through the aperture sections 69.

As described above, the arm section 41 is being engaged with, at the tip end portion, the first move-and-rotate support section 15 of the disk tray 3 to be able to freely move and rotate. Note here that the arm section 41 is curved like an arc not to interfere with the drive shaft 90 pivotally supporting the drive gear 66 when retracting the disk tray 3 into the outer chassis 2.

As described above, the move-and-rotate support piece 16 is a flat rectangular-shaped plate member formed in substantially L-shape, and is formed with, on one end side in the longitudinal direction, the shaft hole 42 penetrating through the width direction. The move-and-rotate support piece 16 is inserted, for supporting, the spindle 43 placed across the side walls of the outer chassis 2. The move-and-rotate support piece 16 is formed with the latch section 44 at the other end side in the longitudinal direction, and the latch section 44 is latched at the second move-and-rotate support section 17 of the disk tray 3 to be able to freely move and rotate. When the disk tray 3 is moved and rotated in the direction of the arrow A and the direction opposite to the arrow A, the move-and-rotate support piece 16 is moved and rotated about the spindle 43. As such, by supporting the rear surface side of the disk tray 3, the move-and-rotate support piece 16 is able to prevent the disk tray 3 from moving to swing at the insertion/removal position, at the recording/reproduction position, and by extension, at the position therebetween.

Figure 16:
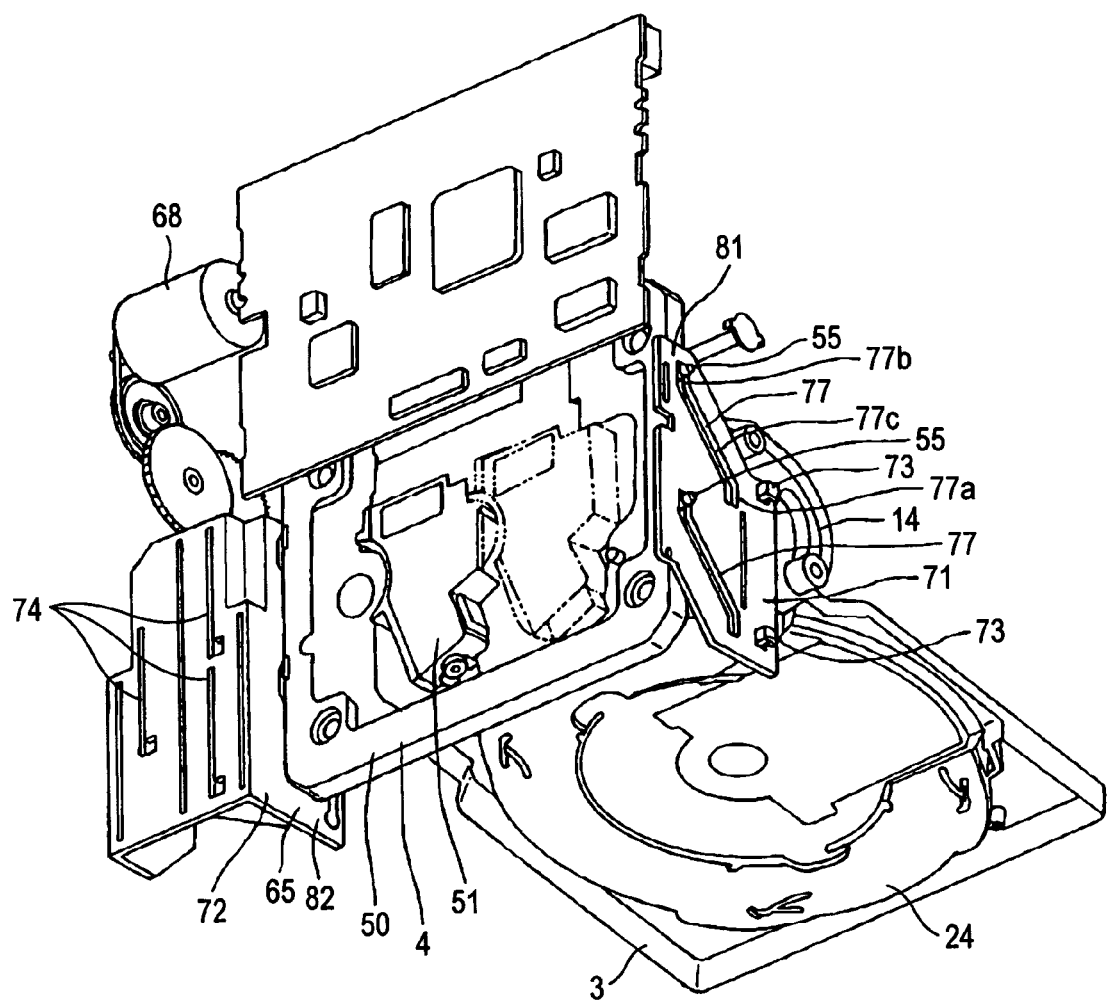
FIG. 16 is a perspective view of a right plate of a cam plate.

Described next is the cam plate 65 that moves the optical pickup unit 4 to be close to or away from the disk tray 3 transferred to the recording/reproduction position. As shown in FIGS. 1 and 16, the cam plate 65 is configured to include a pair of right and left plates 71 and 72 disposed respectively in the vicinity of the right and left side walls 2b and 2c of the outer chassis 2. The cam plate 65 uses such a pair of plates 71 and 72 for moving the base chassis 50 of the optical pickup unit 4.

As shown in FIG. 16, the left plate 71 is disposed on the side of the left side wall 2b of the outer chassis 2, and guides the base chassis 50 at the left side edge. Such a left plate 71 is configured to include a slide guide piece 73 provided to the left side wall 2b of the outer chassis 2 to protrude therefrom. This slide guide piece 73 is inserted into a guide groove (not shown) formed to the left side wall 2b across the vertical direction. With such a configuration, the left plate 71 is allowed to move in the vertical direction along the left side wall 2b.

The right plate 72 is disposed on the side of the right side wall 2c of the outer chassis 2, and guides the base chassis 50 at the right side edge. Such a right plate 72 is formed with guide grooves 74 on the side of the rear surface wall 2d of the outer chassis 2. These guide grooves 74 are respectively inserted into slide guide pieces (not shown) formed to the rear surface wall 2d to protrude therefrom. With such a configuration, the right plate 72 is allowed to move in the vertical direction along the right side wall 2c while being guided by the slide guide pieces. One or more guide grooves 74 may be formed on the right plate 72 on the side of the right side wall 2c and be guided by one or more slide guide pieces formed on the side wall 2c.

These right and left plates 71 and 72 are formed with, respectively, up-and-down racks 75 and 76 for meshing with the drive gears 66, and cam grooves 77 and 78 for insertion of the guide shafts 55 protruding from the side surfaces of the base chassis 50. The up-and-down racks 75 and 76 are respectively formed to rack arms 79 and 80 across the vertical direction to correspond to the position where the drive gears 66 are each disposed. The cam grooves 77 and 78 are respectively formed to cam walls 81 and 82 across the vertical direction to correspond to the position where the base chassis 50 is disposed.

As shown in FIG. 2, the rack arms 79 and 80 are respectively formed with the up-and-down racks 75 and 76 across the vertical direction. Also from the rack arms 79 and 80, the engagement convex sections 83 and 84 are respectively protruded for engagement with the engagement grooves 40b formed to the body sections 40 of the move-and-rotate arms 14 described above (FIG. 2). These engagement convex sections 83 and 84 are each engaged with the engagement groove 40b, and when the move-and-rotate arms 14 are rotated, move in the engagement grooves 40b formed along the rotation direction of the body sections 40. Thereafter, when the move-and-rotate arms 14 are rotated up to the position where the disk tray 3 is moved and rotated to the recording/reproduction position, the plates 71 and 72 are pulled upward because the engagement convex sections 83 and 84 respectively come in contact with the end portions of the engagement grooves 40b, and then moved up and down with the meshing between the up-and-down racks 75 and 76 and the drive gears 66.

The cam grooves 77 and 78 formed to the cam walls 81 and 82 are configured to include, respectively, front-side vertical groove portions 77a and 78a, rear-side vertical groove portions 77b and 78b, and sloped groove portions 77c and 78c serving to link the front-side vertical groove portions 77a and 78a and the rear-side vertical groove portions 77b and 78b. The cam grooves 77 and 78 are provided two each with a space in the vertical direction in accordance with the guide shafts 55 of the base chassis 50. When the plates 71 and 72 are moved up and down by the drive gears 66, as shown in FIGS. 10 and 11, the cam grooves 77 and 78 serve to guide the guide shafts 55 across the front-side vertical groove portions 77a and 78a and the rear-side vertical groove portions 77b and 78b, thereby moving the base chassis 50 to the side of the front surface 2a of the outer chassis 2 or to the side of the rear surface 2d thereof.

When the base chassis 50 is moved to the side of the front surface 2a of the outer chassis 2, the base frame 53 is responsively moved to the chucking position for the turntable 52 and the optical disk, whereby the optical disk is retained to be able to rotate. On the other hand, when the base chassis 50 is moved to the side of the rear surface 2d of the outer chassis 2, the base frame 53 is moved to the chucking-release position for the turntable 52 and the optical disk, whereby the optical disk becomes ready to be transferred to the insertion/removal position.

Described next is the drive gear 66. The drive gear 66 serves to move up and down the cam plate 65, and rotate the move-and-rotate arms 14. The drive gear 66 is formed at the both ends of the drive shaft 90, which is placed across the right and left side walls 2b and 2c of the outer chassis 2. As shown in FIG. 1, the drive gear 66 is a two-stage gear, including a large-diameter gear 66a and a small-diameter gear 66b. The large-diameter gear 66a is meshed with the deceleration gear string 67 to which the rotation force of the drive motor 68 is transmitted, and the small-diameter gear 66b is meshed with the rack portions 40a of the move-and-rotate arms 14 and the up-and-down racks 75 and 76.

With such meshing with the rack portions 40b of the move-and-rotate arms 14, the small-diameter gears 66b of the drive gears 66 move and rotate the disk tray 3 between the recording/reproduction position and the insertion/removal position. Also with such meshing with the up-and-down racks 75 and 76 of the cam plate 65, the small-diameter gears 66b move the base frame 53 being supported by the base chassis 50 between the chucking position with the optical disk and the chucking-release position therewith.

The meshing of the small-diameter gears 66b can be changed with the rack portions 40b or with the up-and-down racks 75 and 76 depending on the rotation operation of the disk tray 3 and the movement of the base chassis 50. Specifically, during the move-and-rotate operation of the disk tray 3, as shown in FIG. 13, the small-diameter gears 66b are meshed with the rack portions 40a of the move-and-rotate arms 14 but not with the up-and-down racks 75 and 76 because the cam plate 65 is located below the outer chassis 2. At this time, with the engagement of the engagement convex sections 83 and 84 with the engagement grooves 40b of the move-and-rotate arms 14, the rack arms 79 and 80 respectively move inside of the engagement grooves 40b in response to the rotation of the move-and-rotate arms 14. With the cam plate 65 located below as such, the base chassis 50 is moved for shelter to the rear surface side of the outer chassis 2 by the guide shafts 55 being guided by the rear-side vertical groove portions 77b and 78b of the cam grooves 77 and 78.

When the move-and-rotate arms 14 are moved and rotated by the drive gears 66, and when the disk tray 3 is moved and rotated almost to the recording/reproduction position from the insertion/removal position, as shown in FIG. 14, the engagement convex sections 83 and 84 respectively being moved in the engagement grooves 40b are pulled upward by the end portions thereof so that the rack arms 79 and 80 are moved upward. This results in the meshing of the small-diameter gears 66b with the up-and-down racks 75 and 76 of the rack arms 79 and 80, thereby moving upward the plates 71 and 72. When the disk tray 3 is moved and rotated to the recording/reproduction position, the meshing of the small-diameter gears 66b with the rack portions 40a of the move-and-rotate arms 14 is released, thereby stopping the rotation of the move-and-rotate arms 14.

Note that, immediately before the meshing is released between the move-and-rotate-arms 14 and the small-diameter gears 66b, guide pins 86 provided to protrude from the cam plate 65 engage with guide grooves 87 formed to the side surfaces of the disk tray 3 (FIGS. 9 and 10). This engagement allows the guide pins 86 and the move-and-rotate arms 14 to keep supporting the disk tray 3 even after the meshing with the small-diameter gears 66b is released, thereby restricting the movement and rotation. After the meshing with the move-and-rotate arms 14 is released, the disk tray 3 is guided to the recording/reproduction position by the guide pins 86 moving to slide the guide grooves 87.

By the small-diameter gears 66b moving upward the plates 71 and 72, the guide shafts 55 engaged with the rear-side vertical groove portions 77b and 78b of the cam grooves 77 and 78 are moved to the front-side vertical groove portions 77a and 78a via the sloped groove portions 77c and 78c. In response thereto, the base frame 53 is moved from the chucking-release position to the chucking position together with the base chassis 50, and the turntable 52 supported by the base frame 53 enters into the center hole of an optical disk retained by the disk tray 3 (FIGS. 11 and 15).

During when the base frame 53 is moved from the chucking-release position to the chucking position as such, the small-diameter gears 66b remain meshed with the up-and-down racks 75 and 76, and also remain not-meshed with the rack portions 40a of the move-and-rotate arms 14. When the recording or reproduction of information signals is completed with respect to the optical disk, and when a command is issued for ejection of the optical disk, the small-diameter gears 66b move down the rack arms 79 and 80, and move the base frame 53 to the chucking-release position. After the small-diameter gears 66b move the base frame 53 to the chucking-release position as such, the meshing with the up-and-down racks 75 and 76 is released. At this time, the engagement convex sections 83 and 84 of the rack arms 79 and 80 are respectively engaged with the engagement grooves 40b through the aperture sections 69 of the move-and-rotate arms 14, and press down the engagement grooves 40b, thereby rotating the move-and-rotate arms 14. By rotating the move-and-rotate arms 14 through meshing with the rack portions 40a of the move-and-rotate arms 14 as such, the small-diameter gears 66b move and rotate the disk tray 3 from the recording/reproduction position to the insertion/removal position.

The drive motor 68 driving such drive gears 66 and the deceleration gear string 67 coupling together the drive motor 68 and the drive gears 66 are both disposed on the side of the right side wall 2c of the outer chassis 2. The drive motor 68 moves and rotates the disk tray 3 between the insertion/removal position and the recording/reproduction position by being driven in the forward or reverse direction. The drive motor 68 also moves the base frame 53 between the chucking position and the chucking-release position by moving the base chassis 50 to the side of the front surface 2a of the outer chassis 2, or to the side of the rear surface 2d thereof.

Described next is a transfer process for the disk drive device configured as such to transfer an optical disk. While the disk drive device 1 is waiting for insertion of an optical disk, the disk tray 3 is moved and rotated to the recording/reproduction position, and is housed inside of the outer chassis 2. At this time, in the small-diameter gears 66b, the meshing is established with the rack portions 40a of the move-and-rotate arms 14, and the meshing with the up-and-down racks 75 and 76 of the cam plate 65 is released. When a command comes for ejection of the disk tray 3, the disk drive device 1 drives the drive motor 68 in the forward direction, and rotates the move-and-rotate arms 14 via the small-diameter gears 66b. As a result, the disk tray 3 is moved and rotated in the direction opposite to the arrow A, and then is ejected to the outside of the outer chassis 2 from the tray insertion/removal port 10. After the disk tray 3 is ejected, the placement surface section 12 is stopped at the insertion/removal position when it is substantially vertical. At this time, in the clamper 5, the cam roller 61 is moved and rotated in the direction opposite to the arrow B against the biasing force of the coil spring 59 while sliding in contact with the bank section 13 of the disk tray 3, and inside of the outer chassis 2, the clamp plate 56 is retained while being substantially horizontal (FIGS. 9 and 12).

When the disk tray 3 is moved and rotated to the insertion/removal position, in the retention member 22 provided to the placement surface section 12, the support section 27 is moved for shelter into the shelter concave section 31 by the guide convex section 29 of the retention arm 23 guiding the rotation restriction groove 33 of the rotor 24 to the shelter groove portion 33a. As such, the placement surface section 12 becomes available for any optical disk irrespective of its diameter size on the large- and small-diameter concave portions 12a and 12b (FIG. 6).

When an optical disk is placed on the placement surface section 12, and when a command comes for a loading operation, in the disk drive device 1, the drive gears 66 and the move-and-rotate arms 14 being meshed with the drive gears 66 are both rotated by the drive motor 68 being driven in the reverse direction, whereby the disk tray 3 is moved and rotated in the direction of the arrow A. When the disk tray 3 is started to be moved and rotated, in the retention member 22, the rotor 24 is rotated via the drive gear string 36 and the rack 35 by the drive motor 25 being driven, thereby guiding the guide convex section 29 of the retention arm 23 from the shelter groove portion 33a of the move-and-rotate restriction groove 33 to the first or second support groove portion 33b or 33c.

When a large-diameter disk is placed on the placement surface section 12, in the retention arm 23, the support section 27 comes in contact with the perimeter surface of the large-diameter disk by the guide convex section 29 moving in the shelter groove portion 33a, thereby restricting the movement and rotation in the inward direction. In this state, when the rotor 24 is rotated to a further degree, the guide convex section 29 is guided to the side of the support groove portion 33b. This thus allows, in the retention arm 23, the support section 27 to support the perimeter surface of the large-diameter disk, thereby preventing the disk from falling off from the placement surface section 12 (FIG. 7).

When a small-diameter disk is placed on the placement surface section 12, in the retention arm 23, the guide convex section 29 moves in the shelter groove portion 33a. When the guide convex section 29 is guided to a branch point of the first and second support groove portions 33b and 33c, the guide convex section 29 is biased to move and rotate to the side of the second support groove portion 33c by the biasing force of the coil spring (not shown) in the direction to the center of the placement surface section 12. In this state, when the rotor 24 is rotated to a further degree, in the retention arm 23, the support section 27 comes in contact with the perimeter surface of the small-diameter disk by the guide convex section 29 being guided by the second support groove portion 33c. This thus allows, in the retention arm 23, the support section 27 to support the perimeter surface of the small-diameter disk, thereby preventing the disk from falling off from the placement surface section 12 (FIG. 8).

After the large- or small-diameter optical disk is supported by the retention arm 23 as such, the disk tray 3 is moved and rotated more in the direction of the arrow A, and then is housed in the outer chassis 2 from the tray insertion/removal port 10. In the disk tray 3, the placement surface section 12 is moved and rotated to the recording/reproduction position at which the placement surface section 12 is substantially vertical. Note here that while the disk tray 3 is being moved and rotated from the insertion/removal position to the recording/reproduction position, the engagement grooves 40b formed to the body sections 40 of the move-and-rotate arms 14 are being engaged with the engagement convex sections 83 and 84 protruding from the rack arms 79 and 80. With the configuration that the engagement grooves 40b are each formed in the shape of an arc along the rotation direction of the body sections 40 of the move-and-rotate arms 14, the engagement convex sections 83 and 84 move along the engagement grooves 40b. Therefore, the rack arms 79 and 80 are not operated to move in the vertical direction, and the up-and-down racks 75 and 76 remain in the state that the meshing with the drive gears 66 is released (FIG. 13).

When the disk tray 3 is moved and rotated in the direction of the arrow A, the damper 5 is also moved and rotated in the direction of the arrow B by the biasing force of the coil spring 59. At this time, by the cam roller 61 formed by hanging from the clamp arm 57 sliding in contact with the bank section 13 of the disk tray 3, the clamp plate 56 of the damper 5 is moved and rotated while keeping a predetermined clearance from the optical disk placed on the placement surface section 12 and the main surface section of the disk tray 3, thereby preventing slide-contact with the optical disk and the main surface section of the disk tray 3. When the disk tray 3 is moved and rotated to the recording/reproduction position, the cam roller 61 moves down from the bank section 13, and by the clamp plate 56 faced to the center hole of the optical disk, the damper 5 becomes able to clamp the optical disk together with the turntable 52 (FIG. 15).

Note here that such a clamper 5 is being biased by the biasing force of the coil spring 59 into the direction same as the move-and-rotate direction of the disk tray 3, thereby being able to move and rotate with no rattling. Moreover, the damper 5 is never exposed to the outside as is rotated inside of the outer chassis 2, thereby favorably allowing flexible design of device configuration operation and external appearance even within electronic devices varying in type, e.g., television unit 8.

When the disk tray 3 is moved and rotated almost to the recording/reproduction position, the rack arms 79 and 80 are moved upward by the engagement convex sections 83 and 84 coming in contact with the end portions of the engagement grooves 40b of the move-and-rotate arms 14 and being pulled up, and the up-and-down racks 75 and 76 are meshed with the drive gears 66 (FIGS. 10 and 14). After the up-and-down racks 75 and 76 are meshed with the drive gears 66 as such, when the disk tray 3 is moved and rotated to the recording/reproduction position, the meshing is released between the rack portions 40a of the move-and-rotate arms 14 and the drive gears 66.

When the drive gears 66 are driven to a further degree in the meshing state with the up-and-down racks 75 and 76, the right and left plates 71 and 72 of the cam plate 65 are moved upward in the outer chassis 2 along the right and left side walls 2b and 2c. When the plates 71 and 72 are moved upward, the guide shafts 55 of the base chassis 50 having been at the rear-side vertical groove portions 77b and 78b of the cam grooves 77 and 78 are guided to the front-side vertical groove portions 77a and 78a via the sloped groove portions 77c and 78c (FIGS. 11 and 15).

The base chassis 50 is moved to the side of the front surface 2a of the outer chassis 2 by the guide shafts 55 being guided to the front-side vertical groove portions 77a and 78a. In response thereto, the base frame 53 is moved from the chucking-release position to the chucking position, and the turntable 52 is inserted through the center hole of an optical disk transferred to the recording/reproduction position. As such, the optical disk is clamped by the turntable 52 and the clamp plate 56, and becomes ready to rotate by the turntable 52.

After the optical disk is clamped by the turntable 52 and the clamp plate 56, in the retention member 22, the rotor 24 is rotated by the drive motor 25 being driven, and the guide convex section 29 of the retention arm 23 is guided to the shelter groove portion 33a from the first or second support groove portion 33b or 33c. As a result, in the retention arm 23, the support section 27 is moved away from the perimeter surface of the optical disk against the biasing force of the coil spring, and the guide groove 30 is moved to the shelter concave section 31. By the retention arm 23 being moved away from the perimeter surface of the optical disk as such, the disk drive device 1 rotates the optical disk, thereby enabling writing and reading of information.

When the base frame 53 is moved to the chucking position, the drive motor 68 is stopped in operation, and the cam plate 65 is not moved upward any more. At this time, the right and left plates 71 and 72 remain meshed with the up-and-down racks 75 and 76 and the drive gears 66.

After the optical disk is through with recording or reproduction, and when a command is issued for an ejection operation of the optical disk, the drive motor 25 of the retention member 22 is driven, and the rotor 24 is rotated. In response, the guide convex section 29 of the retention arm 23 is guided from the shelter groove portion 33a to the first or second support groove portion 33b or 33c depending on the diameter of the optical disk. As such, in the retention arm 23, the support section 27 supports the perimeter surface of the optical disk, thereby preventing the disk from falling off from the placement surface section 12.

Thereafter, the drive motor 68 is driven in the forward direction, and the right and left plates 71 and 72 are responsively moved down along the side walls 2b and 2c of the outer chassis 2 via the up-and-down racks 75 and 76. As a result, in the base chassis 50, the guide shafts 55 are guided from the front-side vertical groove portions 77a and 78a of the cam grooves 77 and 78 to the rear-side vertical groove portions 77b and 78b thereof via the sloped groove portions 77c and 78c, whereby the base frame 53 is moved from the chucking position to the chucking-release position. With the base frame 53 moved to the chucking-release position as such, the turntable 52 is moved away for shelter from the center hole of the optical disk.

When the plates 71 and 72 are moved downward until the base frame 53 reaches the chucking-release position, the engagement convex sections 83 and 84 protruding from the rack arms 79 and 80 are engaged with the engagement grooves 40b of the move-and-rotate arms 14 from the aperture section 69, and the move-and-rotate arms 14 are rotated downward, whereby the rack portions 40a in the move-and-rotate arms 14 are meshed with the drive gears 66. With the move-and-rotate arms 14 meshed with the drive gears 66 as such, in the plates 71 and 72, the meshing between the up-and-down racks 75 and 76 and the drive gears 66 is released. As a result, the meshing with the drive gears 66 is changed from the plates 71 and 72 to the move-and-rotate arms 14, and the driving force of the drive motor 68 is thus supplied to the side of the move-and-rotate arms 14 and the disk tray 3.

In response when the move-and-rotate arms 14 are rotated, the disk tray 3 is moved and rotated in the direction opposite to the arrow A, and is ejected to the outside of the outer chassis 2 via the tray insertion/removal port 10. In response when the cam roller 61 is pressed by the disk tray 3 while sliding in contact with the bank section 13, the damper 5 is moved and rotated in the direction opposite to the arrow B. Thereafter, when the placement surface section 12 is moved and rotated up to the insertion/removal position where it is substantially vertical, the disk tray 3 is stopped in movement and rotation because the drive motor 68 is stopped in operation. When the disk tray 3 is moved and rotated to the insertion/removal position, in the retention member 22, the drive motor 25 is driven so that the support section 27 of the retention arm 23 is moved away from the perimeter surface of the optical disk, and takes shelter to the shelter groove portion 33a. As such, the disk tray 3 becomes able to take out the optical disk from the placement surface section 12, or place another optical disk thereon.

As described in the foregoing, with the disk drive device 1 to which the invention is applied, using the disk tray 3 enables loading of an optical disk only by placing the disk on the placement surface section 12, and enables unloading of the disk only by taking out as it is the disk from the placement surface section 12, thereby easing loading and unloading of the optical disk. In the disk drive device 1, at the time of recording or reproduction, the disk tray 3 is housed in the outer chassis 2 with the placement surface section 12 being substantially vertical. This allows the design of placing tray insertion/removal port 10 to the front surface 2a of the outer chassis 2, and the design with the thickness equal to or smaller than the diameter of an optical disk for the placement surface section 12 of the disk tray 3 in the plane direction at the insertion/removal position of the outer chassis 2.

As such, for the disk drive device 1 and the television unit 8 incorporated with the disk drive device 1, the outer chassis 2 can be thin in the direction along which an optical disk is placed as is of tray type being easy for loading and unloading of an optical disk. Moreover, the tray insertion/removal port 10 can be provided not to the side and upper surfaces but to the front surface side of the outer chassis 2 or the device body of the television unit 8. Accordingly, the right and left portions of the television unit 8 are left available for the close placement of peripheral equipment such as speaker, and any dust or others can be prevented from entering from the upper surface. With a monitor device reduced in width as such, e.g., television unit 8, users become able to load and unload an optical disk at the front of the device body formed with the monitor, thereby favorably increasing the usability.

As an alternative configuration, the disk tray 3 may be provided with a disk retention section for insertion through the center hole of an optical disk, and a spindle motor may be formed as a piece with the disk retention section for rotation thereof, the disk tray 3 is not restricted in direction of moving and rotating to direct the above-described placement surface section 12 to be substantially vertical or horizontal. That is, if with such a configuration, when a user manually chucks an optical disk to the disk tray 3, the optical disk can be loaded or unloaded without falling off even if the placement surface section 12 at the insertion/removal position is not substantially horizontal. As such, if this is the case, flexible design is possible for the direction of the placement surface section 12 at the insertion/removal position and the recording/reproduction position, and the move-and-rotate direction of the disk tray 3.

Figure 3B:
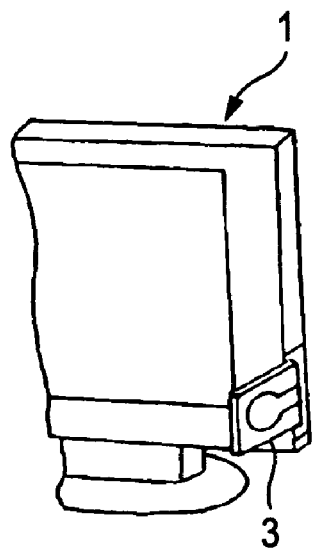
Figure 3C:
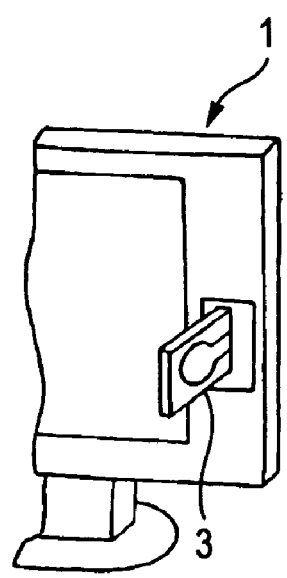

In the embodiment of the invention, for example, the placement surface section 12 is moved and rotated inside and outside of the outer chassis 2 while being substantially vertical. As a result, at the insertion/removal position, the disk tray 3 is exposed to the outside in the state that the placement surface section 12 is substantially orthogonal to the front surface portion 2a of the outer chassis 2 or the front surface 8a of the television unit 8. At the recording/reproduction position, the disk tray 3 is housed in the state that the placement surface section 12 is substantially parallel to the front surface portion 2a of the outer chassis 2 or the front surface 8a of the television unit 8 (FIGS. 3B and 3C). Also in this case, the disk tray 3 is housed at the recording/reproduction position while being substantially horizontal so that the outer chassis 2 or the television unit 8 remains thin in thickness.

In the above description, the base chassis 50 of the optical pickup unit 4 is allowed to freely move in the horizontal direction. This is surely not restrictive, and alternatively, in the disk drive device 1, one end side of the base chassis 50 of the optical pickup unit 4 may be inserted into the outer chassis 2 to be able to freely move and rotate, and the other end side thereof may be configured to be able to freely move and rotate in the fore and aft direction by the guide groove 74 of the cam plate 65. If this is the configuration, the base chassis 50 is operated to move and rotate, by being moved and rotated about its one end side in the fore and aft direction of the outer chassis 2, between the chucking position where the turntable 52 comes close to an optical disk reached at the recording/reproduction position and the chucking-release position where the turntable 52 is moved away from the optical disk.

Moreover, described above is the exemplary case where such a disk drive device 1 in the embodiment of the invention is incorporated in the television unit 8. This is surely not restrictive, and the disk drive device 1 can be incorporated into any other electronic equipment, e.g., personal computer, audio equipment, and audio-visual equipment for use in vehicles.

It should be understood by those skilled in the art that various modifications, combinations, sub-combinations and alterations may occur depending on design requirements and other factors insofar as they are within the scope of the appended claims or the equivalents thereof.

What is claimed is:

1. A transfer mechanism comprising:

a tray that includes a placement surface section on which a recording medium is placed, and retention means for keeping hold of the recording medium placed on the placement surface section, and is moved and rotated across an insertion/removal position at which the tray faces outward from a device body with the placement surface section being substantially horizontal and a recording/reproduction position at which the tray is housed in the device body with the placement surface section being substantially vertical;

a clamp member that is supported inside of the device body to allow a main surface section thereof to move and rotate across a substantially-horizontal direction and a substantially-vertical direction, and clamps, with a support mechanism, the recording medium moved and rotated to the recording/reproduction position; and a movement mechanism that moves the tray;

wherein the tray is provided with, at right and left side edge sections, a bank section that bulges across a longitudinal direction; and the clamp member is biased to move and rotate from a substantially-horizontal state to a substantially-vertical state, and is moved and rotated while sliding in contact with the bank section in response when the tray is moved and rotated.

2. The transfer mechanism according to claim 1, wherein the retention means keeps hold of a perimeter of the recording medium while the tray is being moved and rotated across the insertion/removal position and the recording/reproduction position, and moves away from the recording medium when the clamp member clamps the recording medium at the recording/reproduction position.

3. The transfer mechanism according to claim 1, wherein the tray is supported biaxially.

4. The transfer mechanism according to claim 3, wherein the clamp member is supported uniaxially.

5. The transfer mechanism according to claim 1, wherein in the tray, the retention means is moved in accordance with a diameter of the recording medium placed on the placement surface section.

6. The transfer mechanism according to claim 1, further comprising:

a base unit including a support table for supporting the recording medium reached at the recording/reproduction position, and reading/writing means for writing or reading information to/from the recording medium supported by the support table, the base unit being allowed to move in the substantially-horizontal direction in the device body, wherein the movement mechanism brings the base unit close to the tray to make the support table to support the recording medium after the tray is transferred to the recording/reproduction position.

7. The transfer mechanism according to claim 6, wherein the movement mechanism moves the tray and the base unit by a drive source.

8. A transfer mechanism comprising:

a transfer tray that includes a placement surface section on which a transfer body is placed, and retention means for keeping hold of the transfer body placed on the placement surface section, and is moved and rotated across an insertion/removal position at which the transfer tray faces outward from a device body with the placement surface section being directed in a first direction, and at a housing position at which the transfer tray is housed in the device body with the placement surface section being directed in a second direction that is substantially orthogonal to the first direction; and a drive mechanism that moves and rotates the transfer tray; wherein:

the transfer body is a recording medium, the retention means serves to keep hold of a perimeter surface of the recording medium, the transfer mechanism includes:

a base unit that includes a support table for supporting the recording medium reached at the housing position, and reading/writing means for writing or reading information to/from the recording medium supported by the support table, and in which the support table is allowed to move in a direction to be engaged/disengaged with the recording medium transferred at the housing position; and a clamp member that is supported to be able to move and rotate in the device body, and clamps, with the support table, the recording medium moved and rotated to the housing position, the transfer tray is provided with, at right and left side edge sections, a bank section that bulges across a longitudinal direction, and the clamp member is biased to move and rotate from a substantially-horizontal direction to a substantially-vertical direction, and is moved and rotated while sliding in contact with the bank section in response when the transfer tray is moved and rotated.

9. The transfer mechanism according to claim 8, wherein in the transfer tray, the placement surface section is put in a substantially-horizontal state at the insertion/removal position, and is put in a substantially-vertical state at the housing position.

10. The transfer mechanism according to claim 8, wherein the retention means keeps hold of the recording medium while the transfer tray is being moved and rotated across the insertion/removal position and the housing position, and moves away from the transfer body when the clamp member clamps the recording medium at the housing position.

11. The transfer mechanism according to claim 8, wherein the transfer tray is supported biaxially.

12. The transfer mechanism according to claim 11, wherein the clamp member is supported by uniaxially.

13. The transfer mechanism according to claim 8, wherein the drive mechanism brings the base unit close to the transfer tray to make the support table to support the recording medium after the transfer tray is transferred to the housing position.

* * * * *